(12) United States Patent
Itou et al.

(10) Patent No.: US 12,135,223 B2
(45) Date of Patent: Nov. 5, 2024

(54) POSITION DETECTION DEVICE

(71) Applicant: DENSO CORPORATION, Kariya (JP)

(72) Inventors: Takeshi Itou, Kariya (JP); Hidekazu Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 117 days.

(21) Appl. No.: 17/966,296

(22) Filed: Oct. 14, 2022

(65) Prior Publication Data

US 2023/0030012 A1 Feb. 2, 2023

Related U.S. Application Data

(63) Continuation of application No. PCT/JP2021/014343, filed on Apr. 2, 2021.

(30) Foreign Application Priority Data

Apr. 17, 2020 (JP) ................................ 2020-074423

(51) Int. Cl.
*G01D 11/24* (2006.01)
*G01D 5/14* (2006.01)

(52) U.S. Cl.
CPC ........... *G01D 11/245* (2013.01); *G01D 5/145* (2013.01)

(58) Field of Classification Search
CPC ............................ G01D 5/145; G01D 11/245
See application file for complete search history.

(56) References Cited

U.S. PATENT DOCUMENTS

| | | | |
|---|---|---|---|
| 8,779,761 B2* | 7/2014 | Hiramoto | G01D 5/145 324/245 |
| 2008/0012555 A1* | 1/2008 | Ikeda | G01D 11/245 264/340 |
| 2014/0320119 A1* | 10/2014 | Tsuge | G01P 1/026 324/207.25 |
| 2018/0222096 A1 | 8/2018 | Mizunuma et al. | |
| 2018/0245953 A1* | 8/2018 | Nishimoto | G01D 11/245 |

* cited by examiner

*Primary Examiner* — Reena Aurora
(74) *Attorney, Agent, or Firm* — Nixon & Vanderhye P.C.

(57) ABSTRACT

A sensor includes a detection unit. A resin portion covers the detection unit. A cover is formed of a resin having a linear expansion coefficient different from a linear expansion coefficient of the resin portion to cover a part of the resin portion such that the resin portion protrudes. The resin portion includes a protruding surface facing a direction in which the resin portion protrudes and a side surface connected to the protruding surface. The cover includes a covering surface facing the direction, an inclined surface intersecting with the covering surface and the side surface to be connected to the covering surface and the side surface, and a projecting portion projecting in the direction. The projecting portion is connected to each of the side surface and the inclined surface.

3 Claims, 23 Drawing Sheets

LONGITUDINAL DIRECTION
WIDTH DIRECTION
THICKNESS DIRECTION

POSITION DETECTION DEVICE

CROSS REFERENCE TO RELATED APPLICATION

The present application is a continuation application of International Patent Application No. PCT/JP2021/014343 filed on Apr. 2, 2021, which designated the U.S. and claims the benefit of priority from Japanese Patent Application No. 2020-074423 filed on Apr. 17, 2020. The entire disclosures of all of the above applications are incorporated herein by reference.

TECHNICAL FIELD

The present disclosure relates to a position detection device.

BACKGROUND

Conventionally, a molded article has been used for a mechanical component such as a rotation angle sensor.

SUMMARY

According to an aspect of the present disclosure, a position detection device comprises a sensor including a detection unit configured to output a signal corresponding to a position change of an object to be detected and a resin portion covering the detection unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
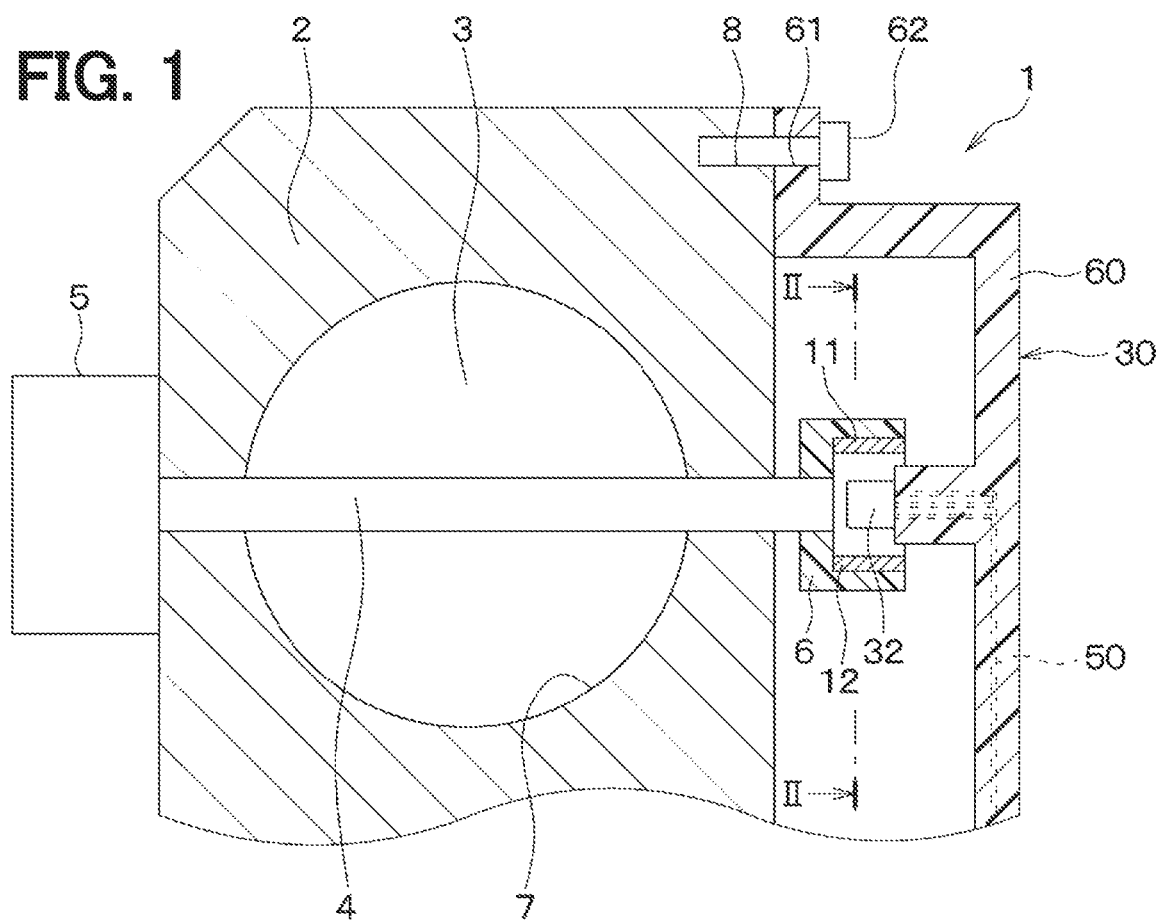
FIG. 1 is a cross-sectional view of an electronically controlled throttle for which a position detection device in a first embodiment is to be used.

Hereinafter, examples of the present disclosure will be described.

According to an example of the present disclosure, a molded article includes a primary molded article and a secondary molded article. The primary molded article is obtained by covering an integrated circuit, a capacitor, and the like with a resin. The secondary molded article is obtained by covering a part of the primary molded article with a resin to fix the primary molded article. The molded article may be used for a rotation angle sensor.

According to the study conducted by the present inventors, in molding of a primary molded article, a thermosetting resin, which flows under a pressure that is lower than a pressure under which a thermoplastic resin flows, is used in order to reduce a load applied to an integrated circuit, a capacitor, and the like during the molding. Meanwhile, in molding of a secondary molded article, a thermoplastic resin is used. The thermoplastic resin is shorter in time to solidification than a thermosetting resin and therefore has a high productivity. In this case, the resin of the primary molded article and the resin of the secondary molded article are different. Therefore, a linear expansion coefficient of the primary molded article and a linear expansion coefficient of the secondary molded article are different from each other. As a result, when a temperature of a molded article is changed due to a temperature change outside the molded article or the like, a thermal stress is caused in the primary molded article and the secondary molded article. This thermal stress is concentrated on a portion, which causes a relatively large shape change, e.g., on a boundary portion between the primary molded article and the secondary molded article. Consequently, a crack may occur in the secondary molded article to damage the secondary molded article.

According to an example of the present disclosure, a position detection device comprises a sensor including a detection unit configured to output a signal corresponding to a position change of an object to be detected and a resin portion covering the detection unit. The position detection device further comprises a cover formed of a resin, which has a linear expansion coefficient different from a linear expansion coefficient of the resin portion, to cover a part of the resin portion such that the resin portion protrudes. The resin portion has a protruding surface facing a direction in which the resin portion protrudes and a side surface connected to the protruding surface. The cover has a covering surface facing the direction in which the resin portion protrudes, an inclined surface intersecting with each the covering surface and the side surface to be connected to each of the covering surface and the side surface, and a projecting portion projecting in the direction in which the resin portion protrudes. The projecting portion is connected to each of the side surface and the inclined surface.

Due to the projecting portion projecting in the direction in which the resin portion protrudes, a cross section of the cover, which is parallel to the direction in which the resin portion protrudes, has a relatively large a section modulus. This allows a reduction in a stress applied to the cover in the vicinity of the boundary portion between the side surface and the inclined surface of the resin portion connected to the projecting portion. As a result, even in a case where the resin of the resin portion of the sensor is different from the resin of the cover, the cover is restricted from being damaged.

Referring to the drawings, a description will be given below of embodiments. Note that parts in the following individual embodiments which are the same as or equal to each other are denoted by the same reference signs, and a description thereof is omitted.

First Embodiment

A position detection device 30 is used in, e.g., an electronically controlled throttle 1. The electronically controlled throttle 1 controls an amount of air to be sucked into a cylinder of an engine of a vehicle. First, a description will be given of the electronically controlled throttle 1.

Figure 2:
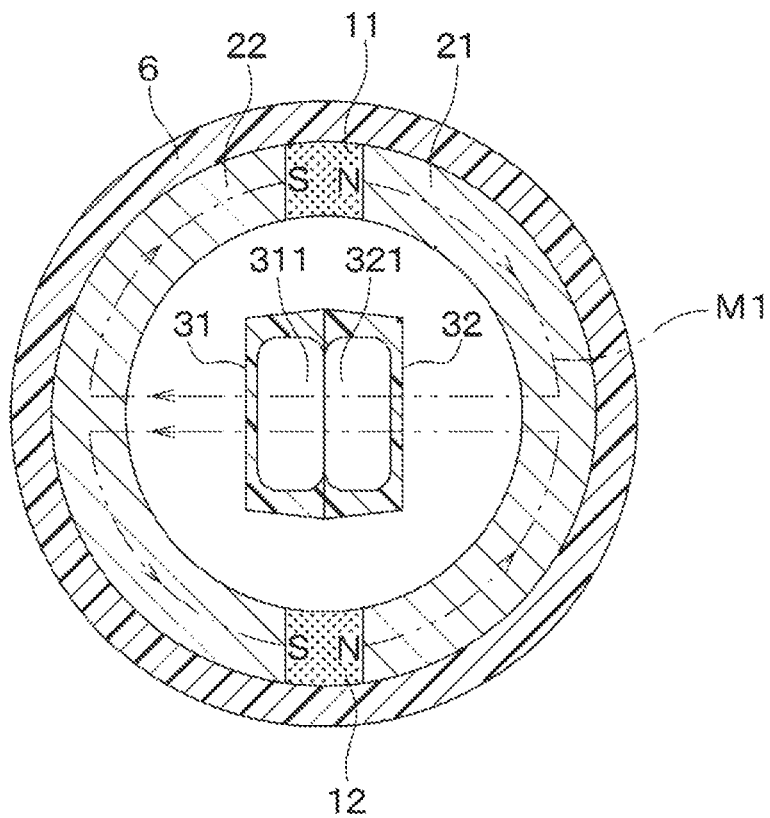
FIG. 2 is an enlarged cross-sectional view along a line II-II in FIG. 1.

As illustrated in FIG. 1 and FIG. 2, the electronically controlled throttle 1 includes a housing 2, a throttle valve 3, a valve shaft 4, a motor 5, a holder 6, a first magnet 11, a second magnet 12, a first yoke 21, a second yoke 22, and the position detection device 30.

The housing 2 contains the throttle valve 3 and the valve shaft 4 each described later. In addition, the housing 2 has an intake flow path 7 and housing holes 8. The intake flow path 7 introduces air into the engine of the vehicle not shown. The housing holes 8 serve as holes for attaching a sensor cover 60 of the position detection device 30 described later.

The throttle valve 3 is formed in a disc shape correspondingly to an object to be detected. The throttle valve 3 is disposed in the intake flow path 7.

The valve shaft 4 is formed in a rod shape. An axial line of the valve shaft 4 extends in a radial direction of the throttle valve 3. The valve shaft 4 is connected to the throttle valve 3 such that the axial line of the valve shaft 4 is perpendicular to an axial direction of the throttle valve 3.

The motor 5 is connected to one end of the valve shaft 4 in an axial direction of the valve shaft 4 to rotate the valve shaft 4 in response to an instruction from an ECU not shown. By the motor 5, the valve shaft 4 is rotated together with the motor 5 around the axial line of the valve shaft 4. The throttle valve 3 connected to the valve shaft 4 rotates together with the valve shaft 4 around the axial line of the valve shaft 4 to thus rotate in the intake flow path 7. By the rotation of the throttle valve 3, the intake flow path 7 is opened and closed. Thus, an amount of air sucked into the cylinder of the engine of the vehicle is controlled. Note that the ECU is the abbreviation of Electronic Control Unit.

The holder 6 is formed in a bottomed cylindrical shape. A bottom portion of the holder 6 is connected to another end of the valve shaft 4 in the axial direction of the valve shaft 4. An axial line of the holder 6 is coincident with the axial line of the valve shaft 4.

The first magnet 11 is connected to an inner wall of the holder 6 in a direction perpendicular to the axial line of the valve shaft 4. As illustrated in FIG. 2, the first magnet 11 is also connected to each of one end of the first yoke 21 and one end of the second yoke 22 in a peripheral direction of the valve shaft 4 around the axial line thereof.

The second magnet 12 is opposed to the first magnet 11 in a direction perpendicular to the axial line of the valve shaft 4. As illustrated in FIG. 1, the second magnet 12 is connected to an inner side wall of the holder 6 in a direction perpendicular to the axial line of the valve shaft 4. Additionally, as illustrated in FIG. 2, the second magnet 12 is also connected to each of another end of the first yoke 21 and another end of the second yoke 22 in the peripheral direction of the valve shaft 4 around the axial line thereof.

For example, a side of the first magnet 11 corresponding to the one end of the first yoke 21 is magnetized herein to an N pole. Meanwhile, a side of the first magnet 11 corresponding to the one end of the second yoke 22 is magnetized to an S pole. Consequently, a first magnetic circuit M1 including a magnetic flux flowing from the N pole of the first magnet 11 through the vicinity of a center of the first yoke 21, the vicinity of a center of the holder 6, the vicinity of a center of the second yoke 22, and the S pole of the first magnet 11 is generated. On the other side, a side of the second magnet 12 corresponding to the other end of the first yoke 21 is magnetized to the N pole. Meanwhile, a side of the second magnet 12 corresponding to the other end of the second yoke 22 is magnetized to the S pole. Consequently, a second magnetic circuit M2 including a magnetic flux flowing from the N pole of the second magnet 12 through the vicinity of the center of the first yoke 21, the vicinity of the center of the holder 6, the vicinity of the center of the second yoke 22, and the S pole of the second magnet 12 is generated. As a result, in the vicinity of the center of the holder 6, the magnetic flux, which flows in the first magnetic circuit M1, and the magnetic flux, which flows in the second magnetic circuit M2, enhance each other. Note that, in FIG. 2, the first magnetic circuit M1 and the second magnetic circuit M2 are schematically indicated by the two-dot-dash lines.

As illustrated in FIG. 1 to FIG. 4, the position detection device 30 includes a first sensor 31, a second sensor 32, a terminal 50, and the sensor cover 60.

Figure 4:
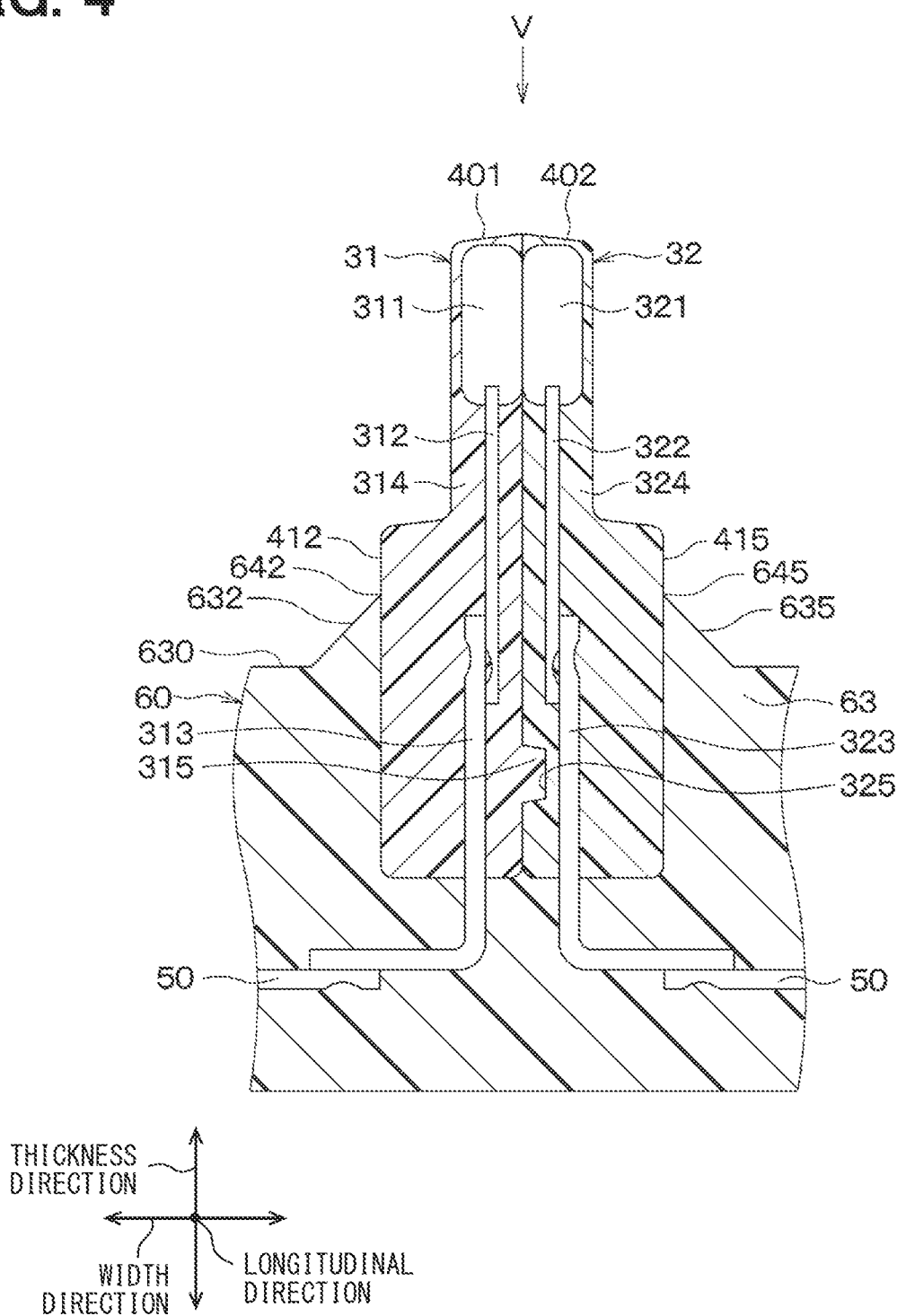
FIG. 4 is a cross-sectional view along a line IV-IV in FIG. 3.

The first sensor 31 outputs a signal corresponding to the magnetic fluxes flowing in the vicinity of the center of the holder 6. Specifically, as illustrated in FIG. 4, the first sensor 31 includes a first magnetic detection element 311, a first lead line 312, a first wire 313, and a first resin portion 314.

The first magnetic detection element 311 corresponds to a detection unit and is, e.g., a Hall element, which is disposed in the vicinity of the center of the holder 6. Accordingly, the first magnetic detection element 311 outputs a signal corresponding to the magnetic fluxes flowing in the vicinity of the center of the holder 6. Note that, in the cross-sectional views of FIGS. 2 and 4, to clarify a location of the first magnetic detection element 311, the first magnetic detection element 311 is shown in white color.

The first lead line 312 is connected to the first magnetic detection element 311.

The first wire 311 is connected to the first lead line 312.

In the first resin portion 314, a resin covers the first magnetic detection element 311, the first lead line 312, and the first wire 313 so as to expose one surface of the first magnetic detection element 311 and a part of the first wire 313. The resin used in the first resin portion 314 is, e.g., a thermosetting resin such as an epoxy resin. The first resin portion 314 includes a fitting portion 315 for combining the first sensor 31 and the second sensor 32 described later. The fitting portion 315 protrudes from an end surface of the first resin portion 314 corresponding to an exposed surface side of the first magnetic detection element 311 toward a second resin portion 324 of the second sensor 32 described later.

Figure 5:
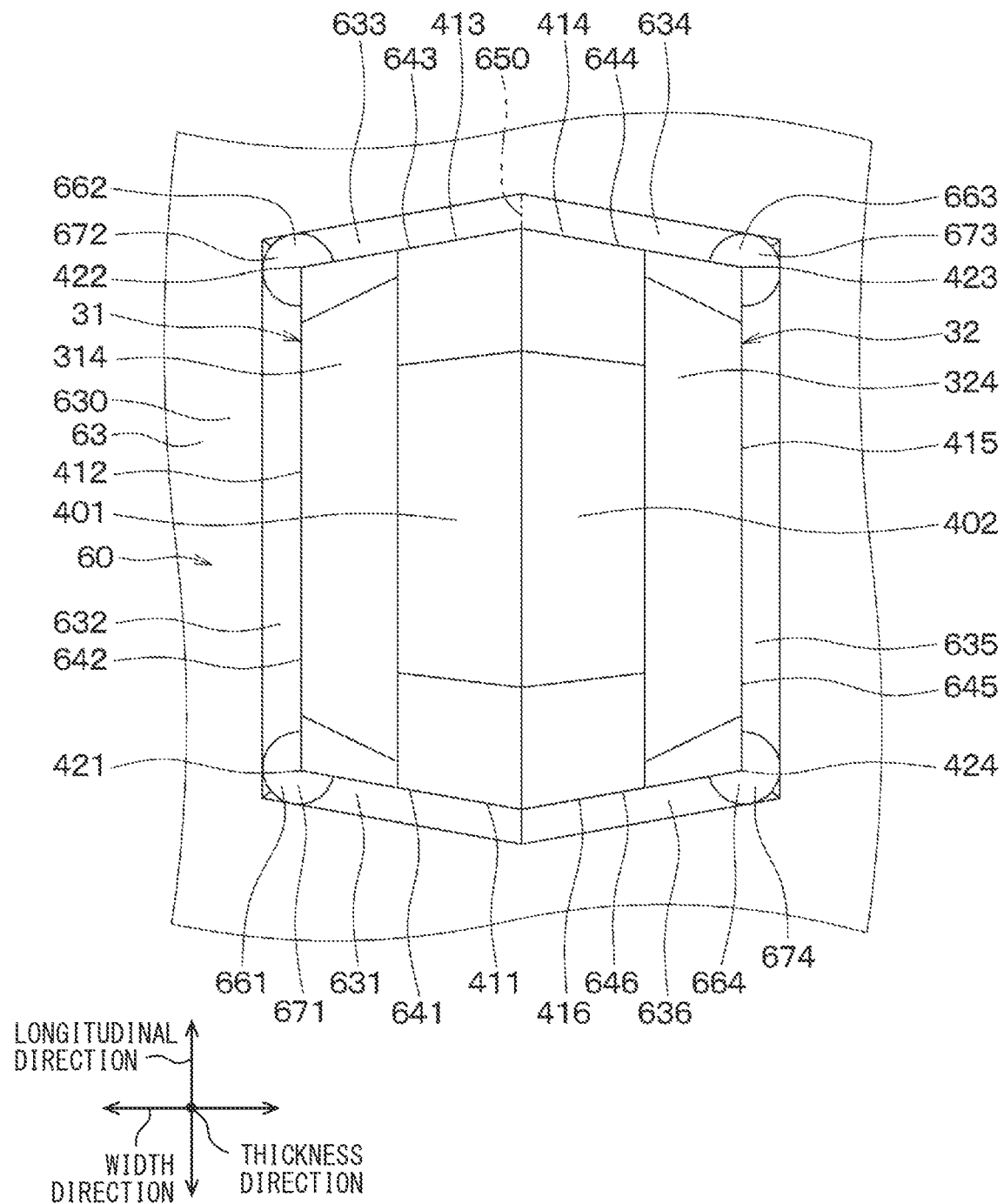
FIG. 5 is an enlarged view as viewed from an arrow V in FIG. 4.
Figure 6:
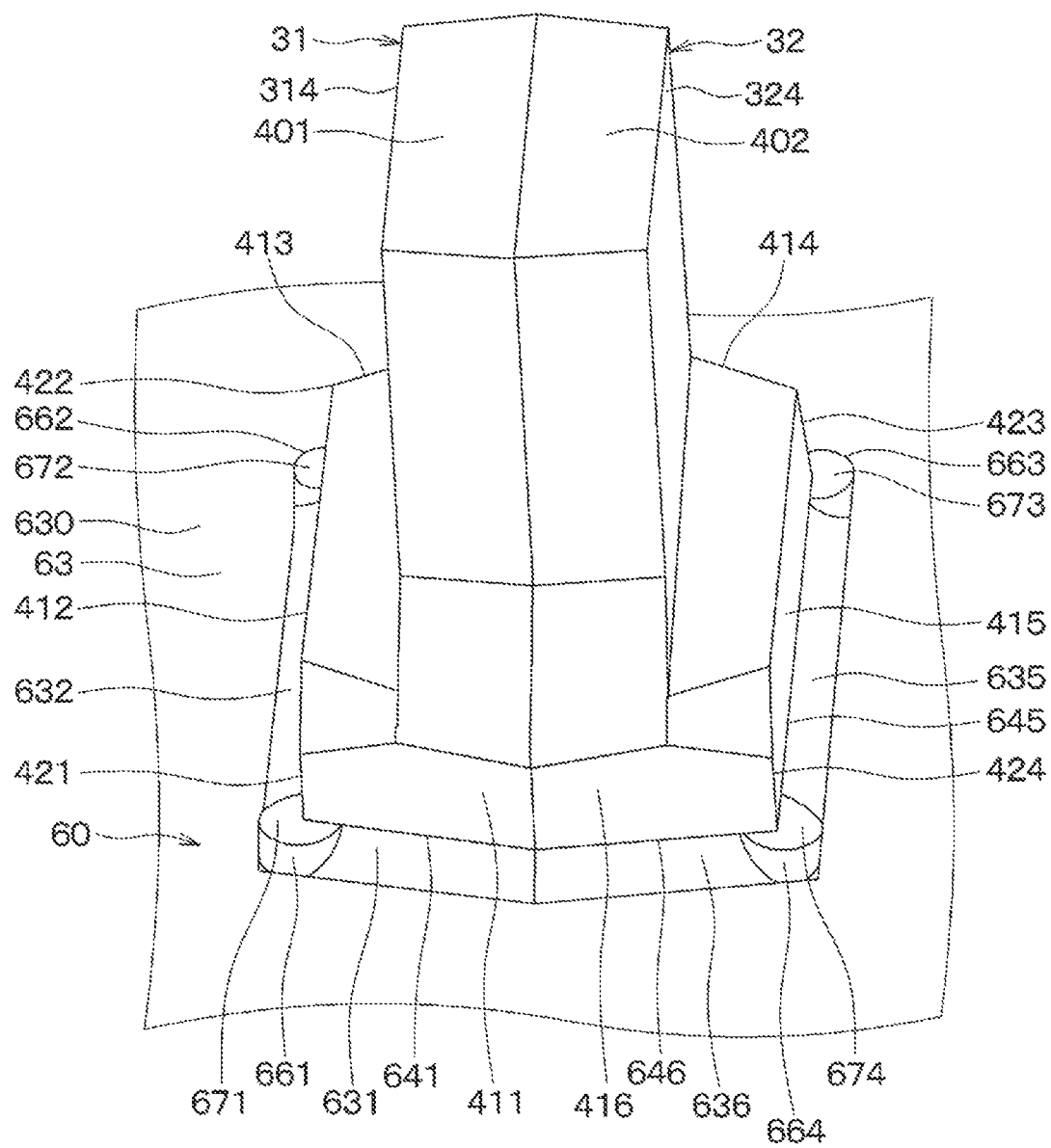
FIG. 6 is a perspective view of a first sensor and a second sensor of the position detection device.

The first resin portion 314 is disposed so as to protrude from the sensor cover 60 described later. As illustrated in FIG. 4 to FIG. 6, the first resin portion 314 includes a first protruding surface 401, a first side surface 411, a second side surface 412, a third side surface 413, a first corner portion 421, and a second corner portion 422.

The first protruding surface 401 faces a direction in which the first resin portion 314 protrudes. The first side surface 411 is connected to the first protruding surface 401. The second side surface 412 is connected to each of the first protruding surface 401 and the first side surface 411. The third side surface 413 is connected to each of the first protruding surface 401 and the second side surface 412. The first corner portion 421 corresponds to a boundary portion between the first side surface 411 and the second side surface 412. The second corner portion 422 corresponds to a boundary portion between the second side surface 412 and the third side surface 413.

Similarly to the first sensor 31, the second sensor 32 outputs a signal corresponding to the magnetic fluxes flowing in the vicinity of the center of the holder 6. Specifically, as illustrated in FIG. 4, the second sensor 32 includes a second magnetic detection element 321, a second lead line 322, a second wire 323, and the second resin portion 324.

The second magnetic detection element 321 corresponds to the detection unit and is, e.g., a Hall element, which is disposed in the vicinity of the center of the holder 6. Accordingly, the second magnetic detection element 321 outputs a signal corresponding to the magnetic fluxes flowing in the vicinity of the center of the holder 6. Note that, in the cross-sectional views of FIGS. 2 and 4, to clarify a location of the second magnetic detection element 321, the second magnetic detection element 321 is shown in white color.

The second lead line 322 is connected to the second magnetic detection element 321.

The second wire 323 is connected to the second lead line 322.

In the second resin portion 324, a resin covers the second magnetic detection element 321, the second lead line 322, and the second wire 323 so as to expose one surface of the second magnetic detection element 321 and a part of the second wire 323. The resin used in the second resin portion 324 is, e.g., a thermosetting resin, similarly to the resin of the first resin portion 314. The second resin portion 324 includes a fitting hole 325 corresponding to a shape of the fitting portion 315 of the first resin portion 314. Into the fitting hole 325, the fitting portion 315 is fitted to combine the first sensor 31 and the second sensor 32 with each other.

The second resin portion 324 is disposed so as to protrude from the sensor cover 60 described later. As illustrated in FIG. 4 to FIG. 6, the second resin portion 324 includes a second protruding surface 402, a fourth side surface 414, a fifth side surface 415, a sixth side surface 416, a third corner portion 423, and a fourth corner portion 424.

The second protruding surface 402 faces a direction in which the second resin portion 324 protrudes. The second protruding surface 402 is also connected to the first protruding surface 401 of the first resin portion 314. The fourth side surface 414 is connected to each of the second protruding surface 402 and the third side surface 413 of the first resin portion 314. The fifth side surface 415 is connected to each of the second protruding surface 402 and the fourth side surface 414. The sixth side surface 416 is connected to each of the second protruding surface 402, the fifth side surface 415, and the first side surface 411 of the first resin portion 314. The third corner portion 423 corresponds to a boundary portion between the fourth side surface 414 and the fifth side surface 415. The fourth corner portion 424 corresponds to a boundary portion between the fifth side surface 415 and the sixth side surface 416. Note that the direction in which the second resin portion 324 protrudes is the same as the direction in which the first resin portion 314 protrudes.

The terminal 50 is connected to each of the first wire 313, the second wire 323, and the ECU not shown.

Figure 3:
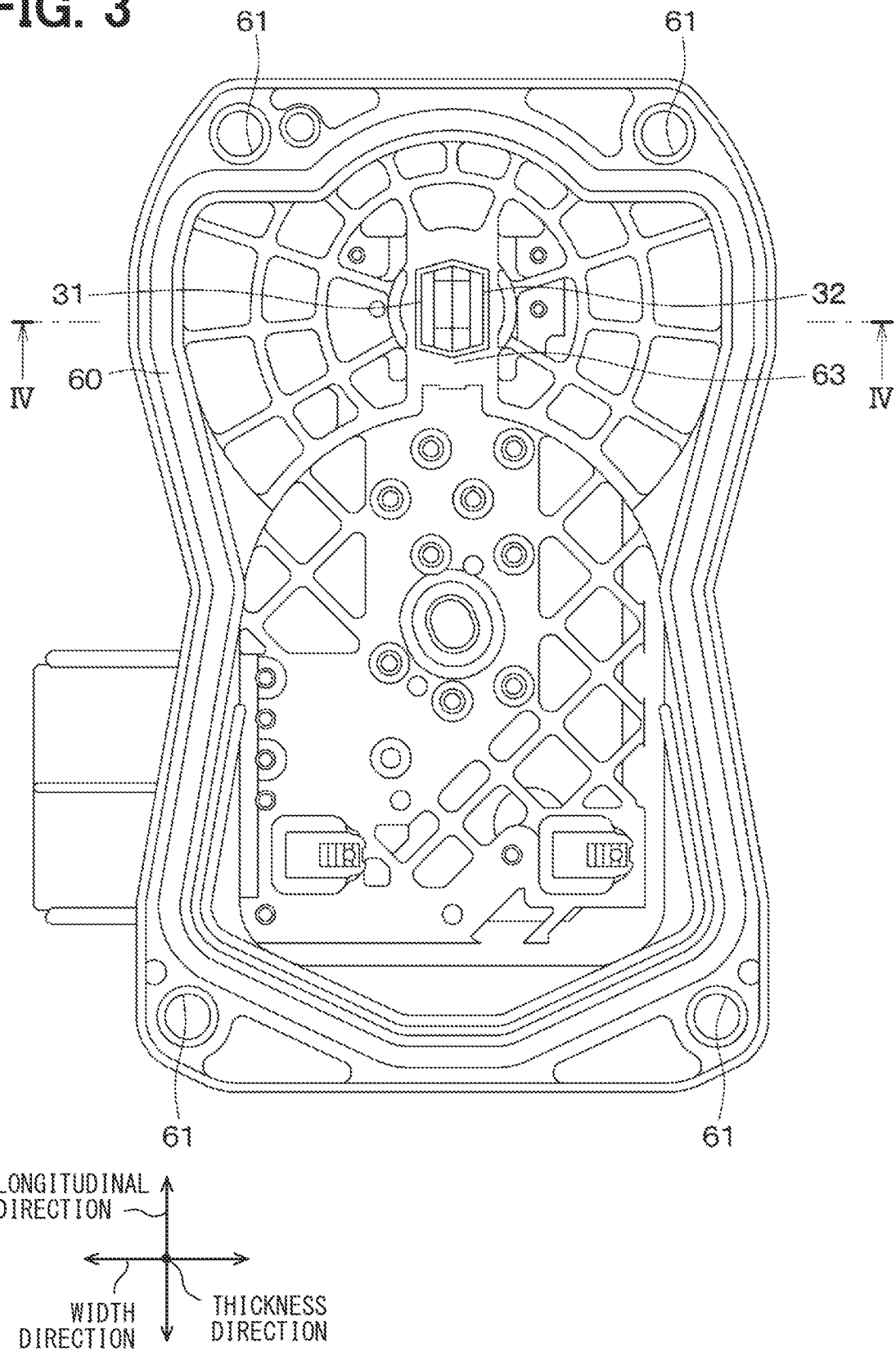
FIG. 3 is an outer appearance view of the position detection device.

As illustrated in FIG. 3, the sensor cover 60 is formed in a plate shape. The sensor cover 60 is molded of a resin different in type, composition, linear expansion coefficient, or the like from the resins of the first resin portion 314 and the second resin portion 324. The resin used to mold the sensor cover 60 is a thermoplastic resin such as, e.g., polybutylene terephthalate. Specifically, as illustrated in FIG. 1 to FIG. 6, the sensor cover 60 includes cover holes 61, screws 62, and a cover resin portion 63.

As illustrated in FIG. 1, the cover holes 61 are formed to correspond to the shapes and number of the housing holes 8. The screws 62 are inserted into the cover holes 61 and into the housing holes 8 to fix the sensor cover 60 and the housing 2 to each other.

As illustrated in FIG. 4, the cover resin portion 63 covers each of the first wire 313 exposed from the first resin portion 314, the second wire 323 exposed from the second resin portion 324, and the terminal 50. The cover resin portion 63 also covers a part of the first resin portion 314 so as to expose the first resin portion 314 in which the first magnetic detection element 311 is located. As a result, the first resin portion 314 protrudes from the sensor cover 60 in a thickness direction of the sensor cover 60. The cover resin portion 63 also covers a part of the second resin portion 324 so as to expose the second resin portion 324 in which the second magnetic detection element 321 is located. As a result, the second resin portion 324 protrudes from the sensor cover 60 in the thickness direction of the sensor cover 60. Accordingly, the directions in which the first resin portion 314 and the second resin portion 324 protrude are coincident with the thickness direction of the sensor cover 60. Moreover, since the cover resin portion 63 covers the part of the first resin portion 314 and the part of the second resin portion 324, the first magnetic detection element 311 and the second magnetic detection element 321 are fixed at positions in the vicinity of the center of the holder 6.

As illustrated in FIG. 4 to FIG. 6, the cover resin portion 63 includes a covering surface 630 in a range in which the cover resin portion 63 covers the first resin portion 314 and the second resin portion 324. The cover resin portion 63 also includes a first inclined surface 631, a second inclined surface 632, a third inclined surface 633, a fourth inclined surface 634, a fifth inclined surface 635, and a sixth inclined surface 636. The cover resin portion 63 also includes a first boundary portion 641, a second boundary portion 642, a third boundary portion 643, a fourth boundary portion 644, a fifth boundary portion 645, and a sixth boundary portion 646. The cover resin portion 63 further includes a welded portion 650, a first projecting portion 661, a second projecting portion 662, a third projecting portion 663, and a fourth projecting portion 664.

The covering surface 630 extends in a longitudinal direction and a width direction of the plate-shaped sensor cover 60.

The first inclined surface 631 is connected to each of the covering surface 630 and the first side surface 411 of the first resin portion 314. The first inclined surface 631 extends in an inclined direction of a draft of a mold to be used to mold the sensor cover 60. Consequently, the first inclined surface 631 intersects with each of the covering surface 630 and the first side surface 411.

The second inclined surface 632 is connected to each of the covering surface 630, the first inclined surface 631, and the second side surface 412 of the first resin portion 314. The second inclined surface 632 extending in the inclined direction of the draft similarly to the first inclined surface 631 intersects with each of the covering surface 630 and the second side surface 412.

The third inclined surface 633 is connected to each of the covering surface 630, the second inclined surface 632, and the third side surface 413 of the first resin portion 314. The third inclined surface 633 extending in the inclined direction of the draft similarly to the first inclined surface 631 intersects with each of the covering surface 630 and the third side surface 413.

The fourth inclined surface 634 is connected to each of the covering surface 630, the third inclined surface 633, and the fourth side surface 414 of the second resin portion 324. The fourth inclined surface 634 extending in the inclined direction of the draft similarly to the first inclined surface 631 intersects with each of the covering surface 630 and the fourth side surface 414.

The fifth inclined surface 635 is connected to each of the covering surface 630, the fourth inclined surface 634, and the fifth side surface 415 of the second resin portion 324. The fifth inclined surface 635 extending in the inclined direction of the draft similarly to the first inclined surface 631 intersects with each of the covering surface 630 and the fifth side surface 415.

The sixth inclined surface 636 is connected to each of the covering surface 630, the fifth inclined surface 635, the first inclined surface 631, and the sixth side surface 416 of the second resin portion 324. The sixth inclined surface 636 extending in the inclined direction of the draft similarly to the first inclined surface 631 intersects with each of the covering surface 630 and the sixth side surface 416.

The first boundary portion 641 corresponds to a resin boundary portion, and is a boundary portion between the first inclined surface 631 and the first side surface 411. The second boundary portion 642 corresponds to the resin boundary portion, and is a boundary portion between the second inclined surface 632 and the second side surface 412. The third boundary portion 643 corresponds to the resin boundary portion, and is a boundary portion between the third inclined surface 633 and the third side surface 413. The fourth boundary portion 644 corresponds to the resin boundary portion, and is a boundary portion between the fourth inclined surface 634 and the fourth side surface 414. The fifth boundary portion 645 corresponds to the resin boundary portion, and is a boundary portion between the fifth inclined surface 635 and the fifth side surface 415. The sixth boundary portion 646 corresponds to the resin boundary portion, and is a boundary portion between the sixth inclined surface 636 and the sixth side surface 416.

The welded portion 650 is a region of the cover resin portion 63 which is formed by merging of a molten resin flowing in two directions when the sensor cover 60 is molded of a resin. When the sensor cover 60 is molded, e.g., the molten resin flowing from the first side surface 411 side along each of the second side surface 412 and the third side surface 413 and the molten resin flowing from the sixth side surface 416 side along each of the fifth side surface 415 and the fourth side surface 414 are merged herein. Consequently, the welded portion 650 is formed at a boundary portion between the third inclined surface 633 connected to the third side surface 413 and the fourth inclined surface 634 connected to the fourth side surface 414. A direction in which the resin of the welded portion 650 is oriented is different from a direction in which the resin of the cover resin portion 63 is oriented around the welded portion 650. As a result, a strength of the welded portion 650 is relatively lower than a strength of the cover resin portion 63 around the welded portion 650 and, in addition, stress concentration or the like is likely to occur in the welded portion 650. Accordingly, the welded portion 650 is a relatively fragile region of the cover resin portion 63. Note that, in FIG. 5, the welded portion 650 is indicated by the two-dot-dash line.

The first projecting portion 661 extends in the direction in which the first resin portion 314 of the first sensor 31 protrudes. The first projecting portion 661 is formed in an arc prismatic shape, and has an arc-shaped cross section in a cross section when the first projecting portion 661 is cut in a direction perpendicular to the direction in which the first resin portion 314 protrudes. The first projecting portion 661 is connected to each of the first side surface 411, the second side surface 412, the first corner portion 421, the first inclined surface 631, the second inclined surface 632, the first boundary portion 641, and the second boundary portion 642. The first projecting portion 661 includes a first projecting surface 671 facing the direction in which the first resin portion 314 protrudes. The first projecting surface 671 is located between the first protruding surface 401 of the first resin portion 314 and each of the first inclined surface 631 and the second inclined surface 632 of the cover resin portion 63 in the direction in which the first resin portion 314 protrudes.

Similarly to the first projecting portion 661, the second projecting portion 662 extends in the direction in which the first resin portion 314 protrudes. Similarly to the first projecting portion 661, the second projecting portion 662 is also formed in an arc prismatic shape, and has an arc-shaped cross section. The second projecting portion 662 is connected to each of the second side surface 412, the third side surface 413, the second corner portion 422, the second inclined surface 632, the third inclined surface 633, the second boundary portion 642, and the third boundary portion 643. The second projecting portion 662 includes a second projecting surface 672 facing the direction in which the first resin portion 314 protrudes.

The second projecting surface 672 is located between the first protruding surface 401 of the first resin portion 314 and each of the second inclined surface 632 and the third inclined surface 633 of the cover resin portion 63 in the direction in which the first resin portion 314 protrudes.

The third projecting portion 663 extends in the direction in which the second resin portion 324 of the second sensor 32 protrudes. The third projecting portion 663 is formed in an arc prismatic shape, and has an arc-shaped cross section in a cross section when the third projecting portion 663 is cut in a direction perpendicular to the direction in which the second resin portion 324 protrudes. The third projecting portion 663 is connected to each of the fourth side surface 414, the fifth side surface 415, the third corner portion 423, the fourth inclined surface 634, the fifth inclined surface 635, the fourth boundary portion 644, and the fifth boundary portion 645. The third projecting portion 663 includes a third projecting surface 673 facing the direction in which the second resin portion 324 protrudes.

The third projecting surface 673 is located between the second protruding surface 402 of the second resin portion 324 and each of the fourth inclined surface 634 and the fifth inclined surface 635 of the cover resin portion 63 in the direction in which the second resin portion 324 protrudes.

Similarly to the third projecting portion 663, the fourth projecting portion 664 extends in the direction in which the second resin portion 324 protrudes. Similarly to the third projecting portion 663, the fourth projecting portion 664 is also formed in an arc prismatic shape, and has an arc-shaped cross section. The fourth projecting portion 664 is connected to each of the fifth side surface 415, the sixth side surface 416, the fourth corner portion 424, the fifth inclined surface 635, the sixth inclined surface 636, the fifth boundary portion 645, and the sixth boundary portion 646. The fourth projecting portion 664 includes a fourth projecting surface 674 facing the direction in which the second resin portion 324 protrudes.

The fourth projecting surface 674 is located between the second protruding surface 402 of the second resin portion 324 and each of the fifth inclined surface 635 and the sixth inclined surface 636 of the cover resin portion 63 in the direction in which the second resin portion 324 protrudes.

As described above, the position detection device 30 is configured. This position detection device 30 detects a rotation angle as a change in the position of the throttle valve 3 as an object to be detected.

Next, a description will be given of the detection of the rotation angle of the throttle valve 3 by the position detection device 30.

For example, in response to an instruction from the ECU not shown, the motor 5 rotates from an initial state to rotate the valve shaft 4. The valve shaft 4 is connected herein to each of the throttle valve 3 and the holder 6, and consequently the throttle valve 3 and the holder 6 rotate with the rotation of the valve shaft 4. At this time, by the rotation of the throttle valve 3, the rotation angle of the throttle valve 3 is changed. In addition, by the rotation of the holder 6, the first magnet 11 and the second magnet 12 which are connected to the holder 6 are rotated to change orientations of paths of the magnetic fluxes flowing through the first magnetic circuit M1 and the second magnetic circuit M2. Consequently, orientations of paths of the magnetic fluxes flowing in the vicinity of the center of the holder 6 are also changed. As a result, of the magnetic fluxes flowing in the vicinity of the center of the holder 6, the magnetic fluxes detected by the first magnetic detection element 311 and the second magnetic detection element 321 are changed.

Therefore, the first magnetic detection element 311 detects the change in the magnetic flux and thereby detects a change in the rotation angle of the throttle valve 3. A signal detected by the first magnetic detection element 311 is output to the ECU not shown via the first lead line 312, the first wire 313, and the terminal 50.

Meanwhile, the second magnetic detection element 321 detects the change in the magnetic flux and thereby detects the change in the rotation angle of the throttle valve 3. A signal detected by the second magnetic detection element 321 is output to the ECU not shown via the second lead line 322, the second wire 323, and the terminal 50.

As a result, the ECU not shown calculates the rotation angle on the basis of the signal from either one of the first magnetic detection element 311 and the second magnetic detection element 321. In addition, similarly to the first magnetic detection element 311, the second magnetic detection element 321 detects the change in the magnetic flux that changes as a result of the change in the rotation angle of the throttle valve 3, and therefore, even when the first sensor 31 fails, redundancy of the electronically controlled throttle 1 is ensured.

Thus, the position detection device 30 detects the signal corresponding to the rotation angle of the throttle valve 3. In addition, in the position detection device 30, the sensor cover 60 is restricted from being damaged. A description will be given hereinbelow of the prevention of the damage.

Each of the first resin portion 314 of the first sensor 31 and the second resin portion 324 of the second sensor 32 is formed of the thermosetting resin, while the cover resin portion 63 of the sensor cover 60 is formed of the thermoplastic resin different from the thermosetting resin. The cover resin portion 63 also includes the first projecting portion 661, the second projecting portion 662, the third projecting portion 663, and the fourth projection portion 664, as described above.

The first projecting portion 661 projects along the direction in which the first resin portion 314 protrudes, which is herein the thickness direction of the cover resin portion 63. The first projecting portion 661 is connected to each of the first boundary portion 641 and the second boundary portion 642 which are the boundary portions between the first resin portion 314 and the cover resin portion 63. The second projecting portion 662 projects along the direction in which the first resin portion 314 protrudes. In addition, the second projecting portion 662 is connected to each of the second boundary portion 642 and the third boundary portion 643 which are the boundary portions between the first resin portion 314 and the cover resin portion 63.

A cross section of the cover resin portion 63 in a portion in which the cover resin portion 63 is cut in the thickness direction of the cover resin portion 63 through the first projecting portion 661 or the second projecting portion 662 has a section modulus. This section modulus is relatively larger than a section modulus of a cross section of a portion in which the first projecting portion 661 and the second projecting portion 662 are not formed. Accordingly, this configuration enables to reduce a stress applied to the cover resin portion 63 in the vicinity of the boundary portion between the cover resin portion 63 and the first resin portion 314. As a result, even when the resin of the first resin portion 314 of the first sensor 31 is different from the resin of the cover resin portion 63 of the sensor cover 60, the cover resin portion 63 is restricted from being damaged.

The third projecting portion 663 projects along the direction in which the second resin portion 324 protrudes, which is herein the thickness direction of the cover resin portion 63. The third projecting portion 663 is connected to each of the fourth boundary portion 644 and the fifth boundary portion 645 which are the boundary portions between the second resin portion 324 and the cover resin portion 63. The fourth projecting portion 664 projects along the direction in which the second resin portion 324 protrudes. The fourth projecting portion 664 is connected to each of the fifth boundary portion 645 and the sixth boundary portion 646 which are the boundary portions between the second resin portion 324 and the cover resin portion 63.

In the same manner as described above, a cross section of the cover resin portion 63 of a portion in which the cover resin portion 63 is cut in the thickness direction of the cover resin portion 63 through the third projecting portion 663 or the fourth projecting portion 664 has a section modulus. This section modulus is relatively larger than a section modulus of a cross section of a portion in which the third projecting portion 663 and the fourth projecting portion 664 are not formed. Accordingly, in the same manner as described above, this configuration enables to reduce the stress applied to the cover resin portion 63 in the vicinity of the boundary portion between the cover resin portion 63 and the second resin portion 324. As a result, even when the resin of the second resin portion 324 of the second sensor 32 is different from the resin of the cover resin portion 63 of the sensor cover 60, the cover resin portion 63 is restricted from being damaged.

The position detection device 30 also achieves effects as described below.

As described above, the cover resin portion 63 covers the part of the first resin portion 314 and the part of the second resin portion 324 to fix the first magnetic detection element 311 and the second magnetic detection element 321 at the positions in the vicinity of the center of the holder 6. As also described above, in the position detection device 30, the cover resin portion 63 is restricted from being damaged. This prevents the positions of the first magnetic detection element 311 and the second magnetic detection element 321 from being displaced by a reduction in the force to fix the first magnetic detection element 311 and the second magnetic detection element 321 resulting from the damage to the cover resin portion 63. As a result, the accuracy of detection by the first magnetic detection element 311 and the second magnetic detection element 321 is restricted from decreasing, and thus the accuracy of detection by the position detection device 30 is restricted from decreasing.

In addition, the first projecting portion 661 is connected to the first corner portion 421 of the first resin portion 314. The second projecting portion 662 is connected to the second corner portion 422 of the first resin portion 314. The third projecting portion 663 is connected to the third corner portion 423 of the second resin portion 324. The fourth projecting portion 664 is connected to the fourth corner portion 424 of the second resin portion 324. Consequently, a cross section, which is parallel to the thickness direction of the cover resin portion 63 in the vicinity of the corner portion of the cover resin portion 63, has a relatively large section modulus. Therefore, in the vicinity of a corner portion of the cover resin portion 63 in which stress concentration is likely to occur, the stress applied to the cover resin portion 63 can be reduced. This prevents the cover resin portion 63 from being damaged.

The first inclined surface 631 intersects with each of the covering surface 630 and the first side surface 411. The second inclined surface 632 intersects with each of the covering surface 630 and the second side surface 412. The third inclined surface 633 intersects with each of the covering surface 630 and the third side surface 413. The fourth inclined surface 634 intersects with each of the covering surface 630 and the fourth side surface 414. The fifth inclined surface 635 intersects with each of the covering surface 630 and the fifth side surface 415. The sixth inclined surface 636 intersects with each of the covering surface 630 and the sixth side surface 416. The first inclined surface 631, the second inclined surface 632, the third inclined surface 633, the fourth inclined surface 634, the fifth inclined surface 635, and the sixth inclined surface 636 can be used as the draft of the mold to be used to mold the sensor cover 60. Accordingly, it is easier to retrieve the sensor cover 60 from the mold when the sensor cover 60 is molded.

Second Embodiment

In the second embodiment, forms of the first projecting portion 661, the second projecting portion 662, the third projecting portion 663, and the forth projecting portion 664 are different from those in the first embodiment. The second embodiment is otherwise the same as the first embodiment.

Figure 7:
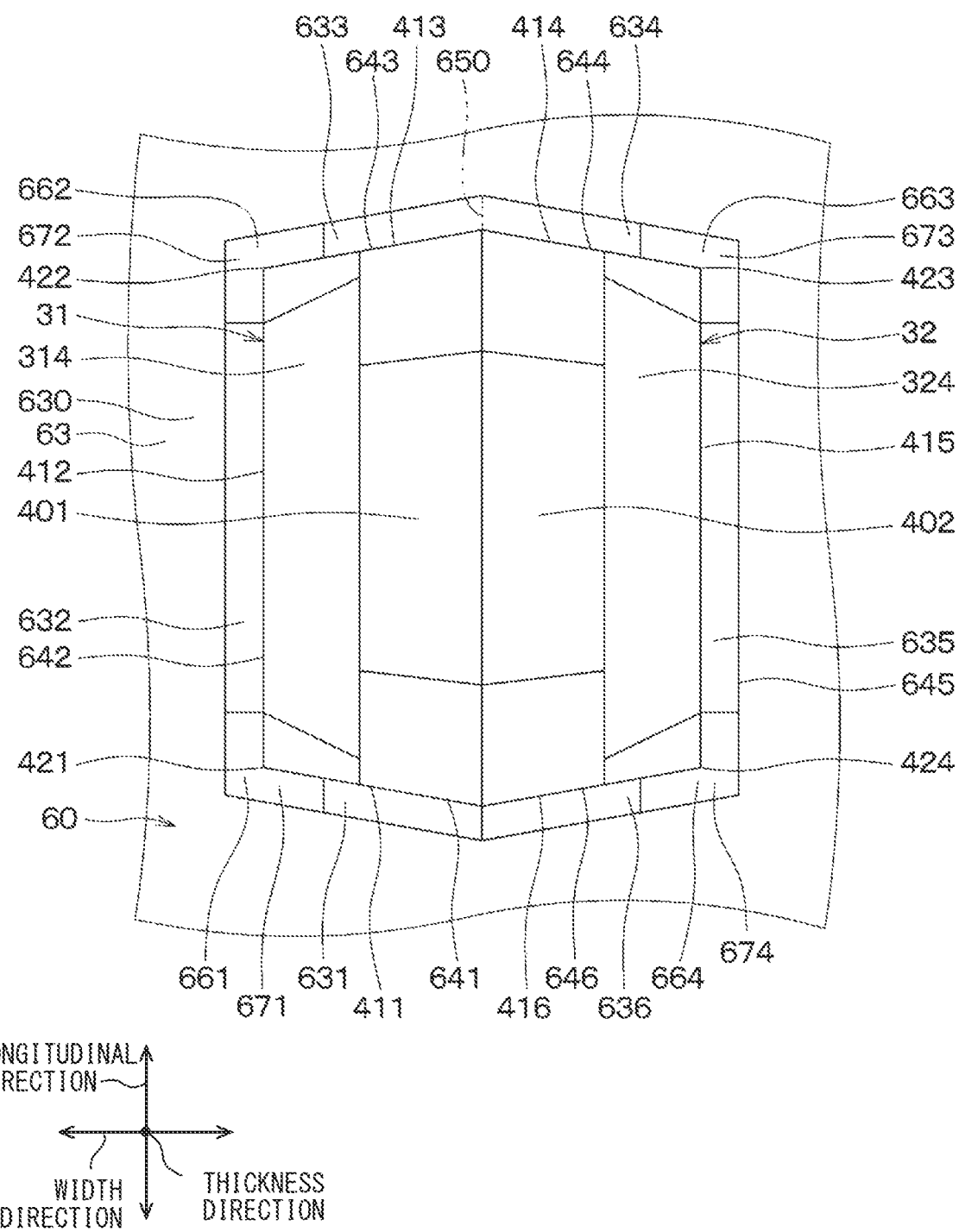
FIG. 7 is a top view of a first sensor and a second sensor of a position detection device in a second embodiment.
Figure 8:
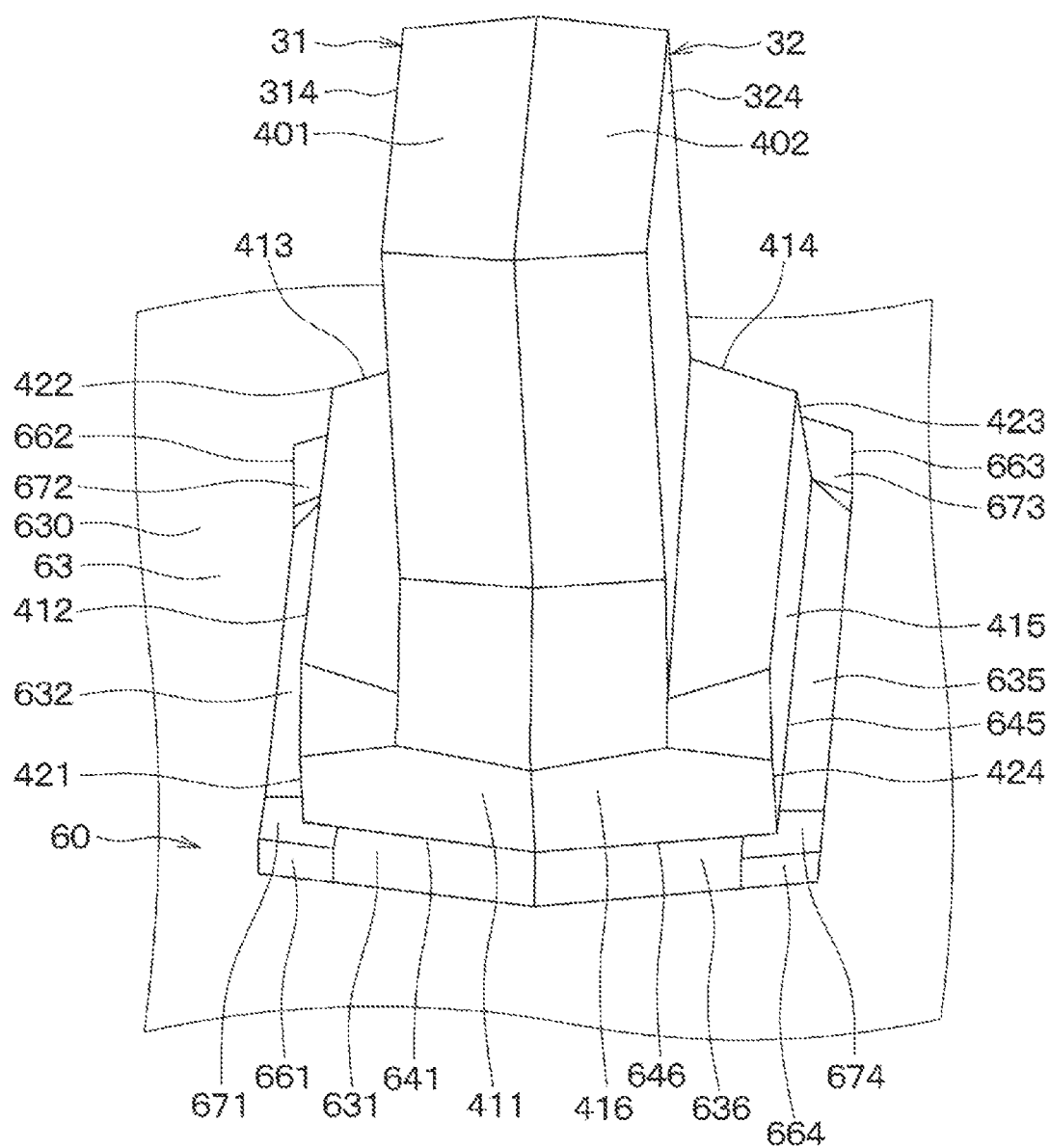
FIG. 8 is a perspective view of the first sensor and the second sensor of the position detection device.

As illustrated in FIG. 7 and FIG. 8, each of the first projecting portion 661 and the second projecting portion 662 is formed in a prismatic shape. Accordingly, a cross section of the first projecting portion 661 perpendicular to the direction in which the first resin portion 314 protrudes has a hexagonal shape. Similarly to the cross section of the first projecting portion 661, a cross section of the second projecting portion 662 perpendicular to the direction in which the first resin portion 314 protrudes has a hexagonal shape.

Similarly to the first projecting portion 661 and the second projecting portion 662, the third projecting portion 663 and the fourth projecting portion 664 are also formed in prismatic shapes. Accordingly, a cross section of the third projecting portion 663 perpendicular to the direction in which the second resin portion 324 protrudes has a hexagonal shape. A cross section of the fourth projecting portion 664 perpendicular to the direction in which the second resin portion 324 protrudes has a hexagonal shape.

Thus, the second embodiment is configured. In the second embodiment also, the same effects as achieved in the first embodiment are achieved.

Third Embodiment

In the third embodiment, the cover resin portion 63 of the sensor cover 60 does not include the first projecting portion 661, the second projecting portion 662, the third projecting portion 663, and the fourth projecting portion 664, but includes a welded projecting portion 651. The third embodiment is otherwise different from the first embodiment.

Figure 9:
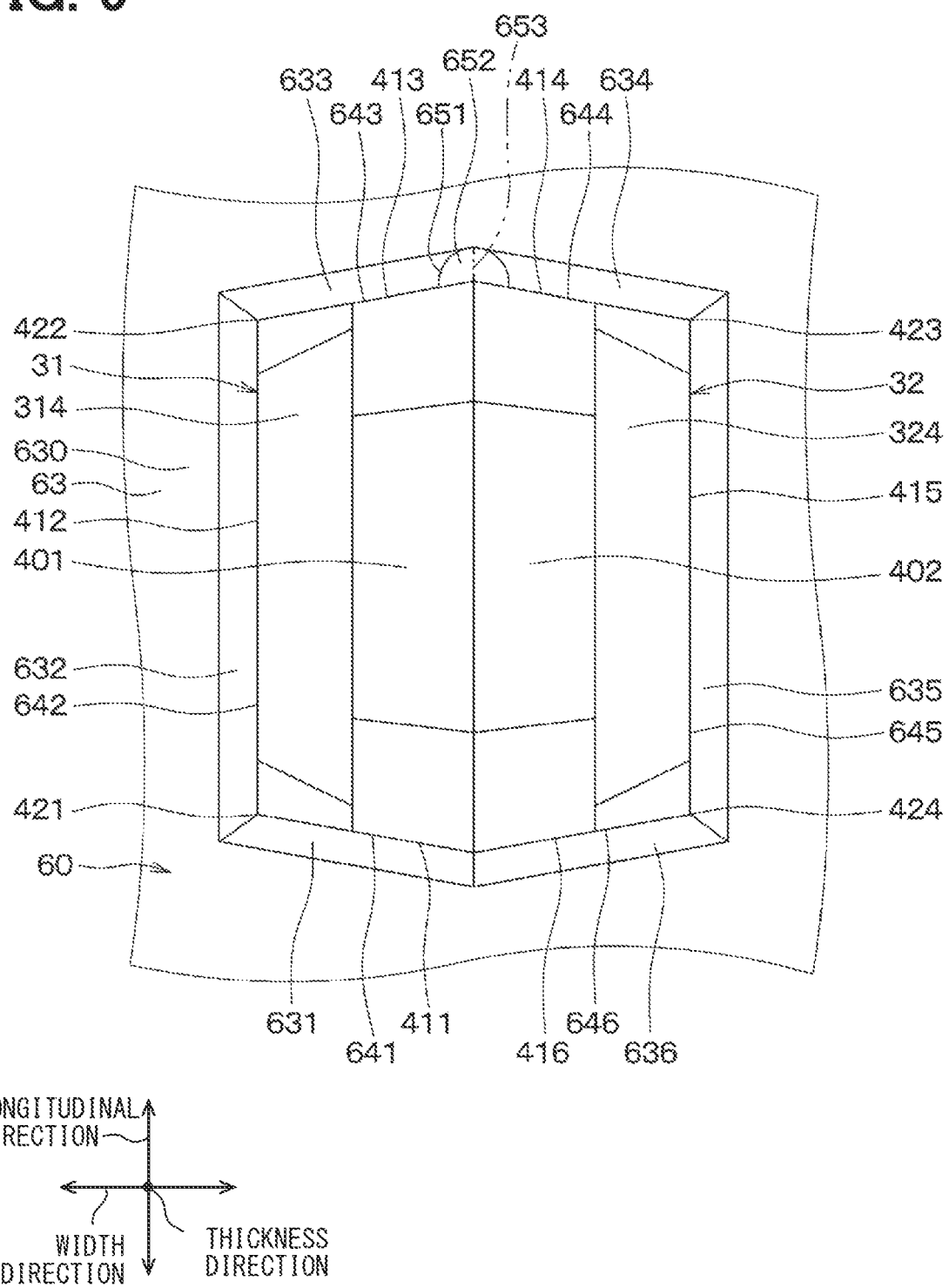
FIG. 9 is a top view of a first sensor and a second sensor of a position detection device in a third embodiment.
Figure 10:
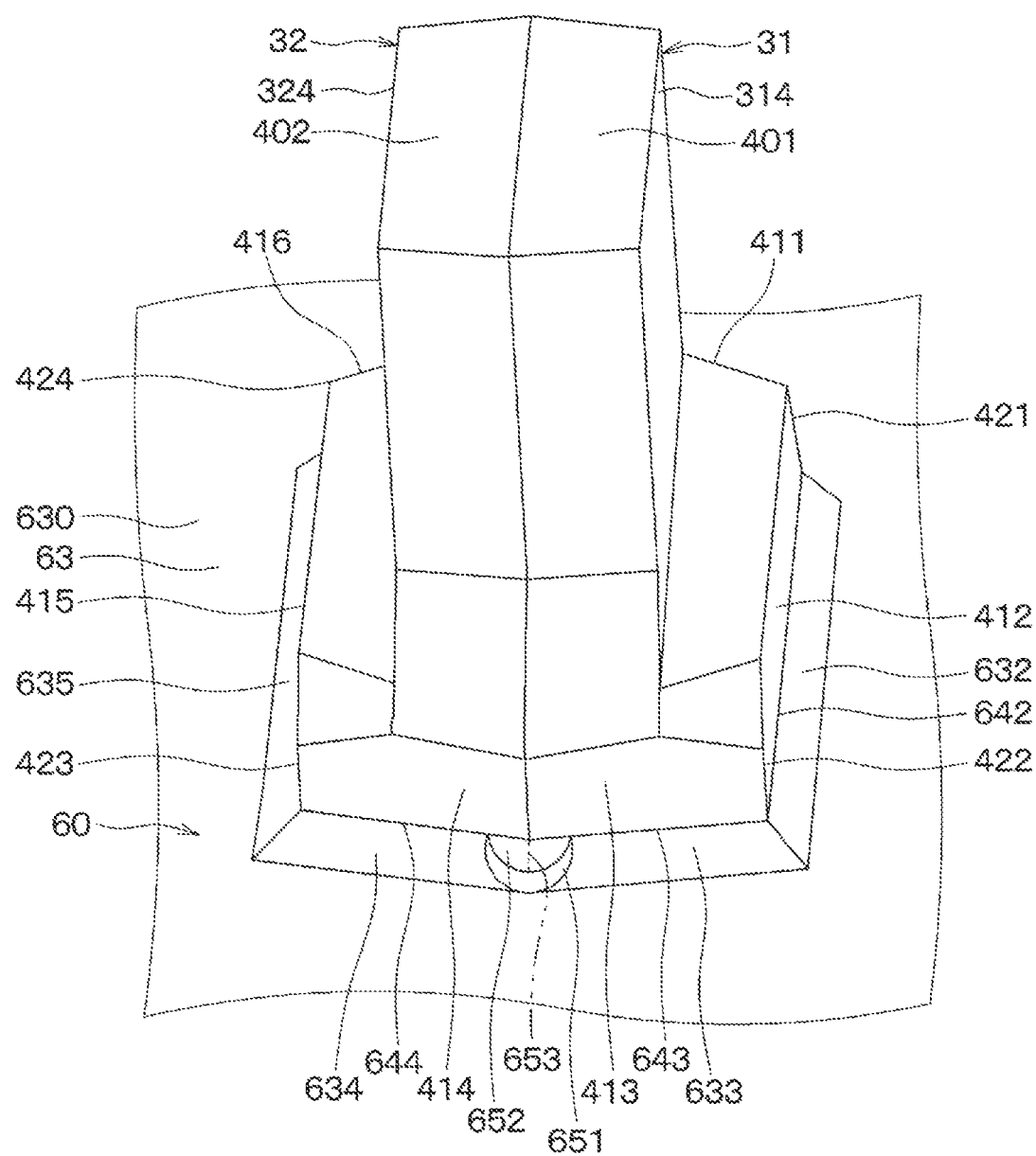
FIG. 10 is a perspective view of the first sensor and the second sensor of the position detection device.

As illustrated in FIG. 9 and FIG. 10, the welded projecting portion 651 extends in the thickness direction of the sensor cover 60, which is herein the directions in which the first resin portion 314 and the second resin portion 324 protrude. The welded projecting portion 651 is formed in an arc prismatic shape, and has an arc-shaped cross section in a cross section when the welded projecting portion 651 is cut in a direction perpendicular to the thickness direction of the sensor cover 60. The welded projecting portion 651 is connected to each of the third side surface 413, the fourth side surface 414, the third inclined surface 633, the fourth inclined surface 634, the third boundary portion 643, and the fourth boundary portion 644. The welded projecting portion 651 includes a welded projecting surface 652 facing the thickness direction of the sensor cover 60.

The welded projecting surface 652 is located between each of the first protruding surface 401 of the first resin portion 314 and the second protruding surface 402 of the second resin portion 324 and each of the third inclined surface 633 and the fourth inclined surface 634 of the cover resin portion 63 in the thickness direction of the sensor cover 60.

The welded projecting portion 651 is a region of the cover resin portion 63 which is formed by merging of a molten metal flowing in two directions when the sensor cover 60 is molded. In the same manner as described above, when the sensor cover 60 is molded, the molten resin flowing from the first side surface 411 side along each of the second side surface 412 and the third side surface 413 and the molten resin flowing from the sixth side surface 416 side along each of the fifth side surface 415 and the fourth side surface 414 are merged. Accordingly, the welded projecting portion 651 connected to each of the third side surface 413 and the fourth side surface 414 includes a welded portion 653.

The welded portion 653 is formed in the vicinity of a center of the welded projecting portion 651. Note that, in FIG. 9 and FIG. 10, the welded portion 653 is indicated by the two-dot-dash line.

Thus, the third embodiment is configured. In the third embodiment also, the same effects as achieved in the first embodiment are achieved. In addition, in the third embodiment, the welded projecting portion 651 including the welded portion 653, which is a relatively fragile region of the cover resin portion 63, extends in the thickness direction of the sensor cover 60. Due to the welded projecting portion 651, a cross section of the cover resin portion 63 when the cover resin portion 63 in the vicinity of the welded portion 653 is cut in the thickness direction of the sensor cover 60 has a relatively large section modulus. As a result, in the cover resin portion 63 in the vicinity of the welded portion 653 in which stress concentration is likely to occur, a stress applied to the cover resin portion 63 can be reduced. This prevents the cover resin portion 63 from being damaged.

Fourth Embodiment

In the fourth embodiment, a form of the welded projecting portion 651 is different from that in the third embodiment. The fourth embodiment is otherwise the same as the third embodiment.

Figure 11:
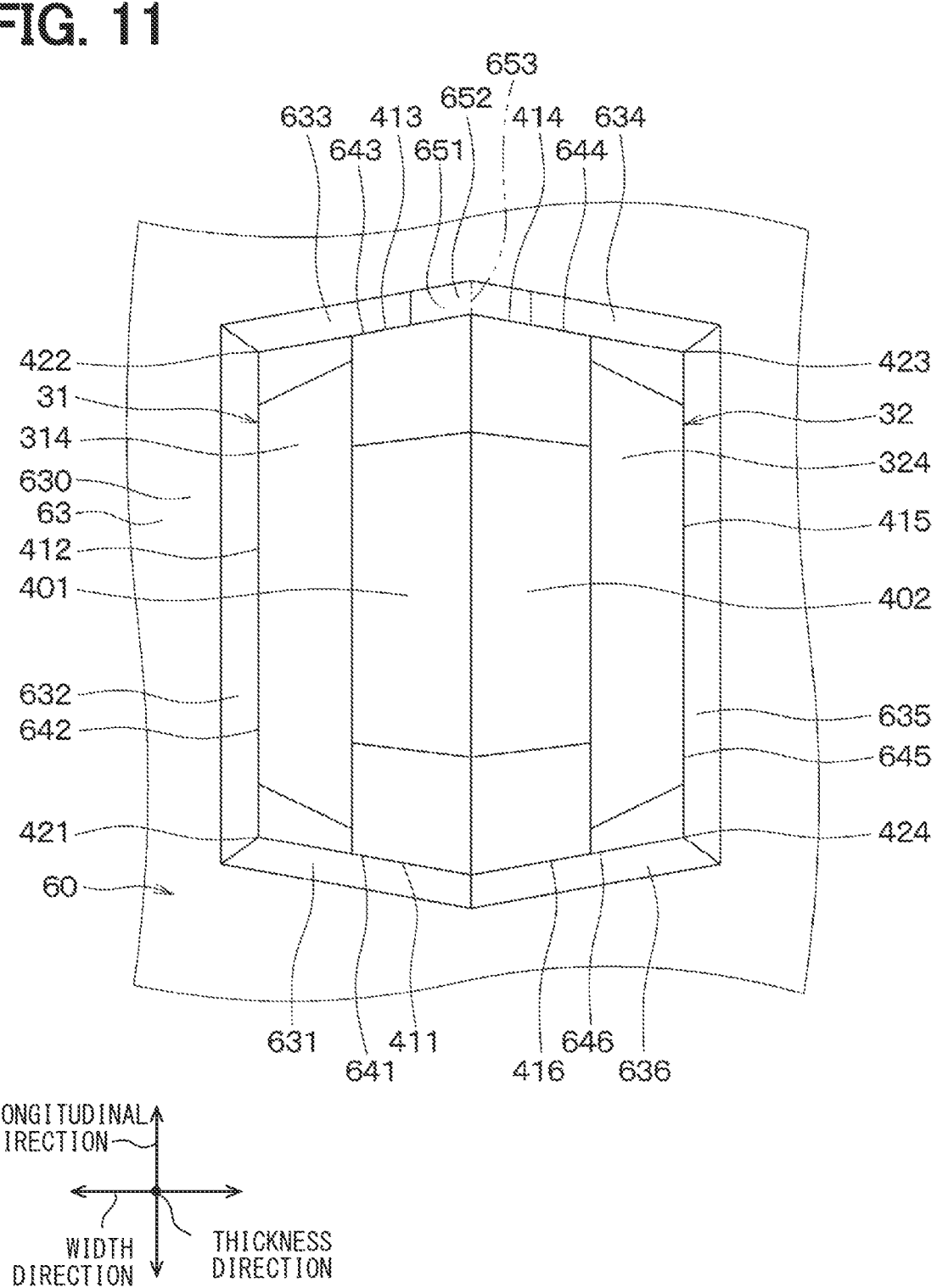
FIG. 11 is a top view of a first sensor and a second sensor of a position detection device in a fourth embodiment.
Figure 12:
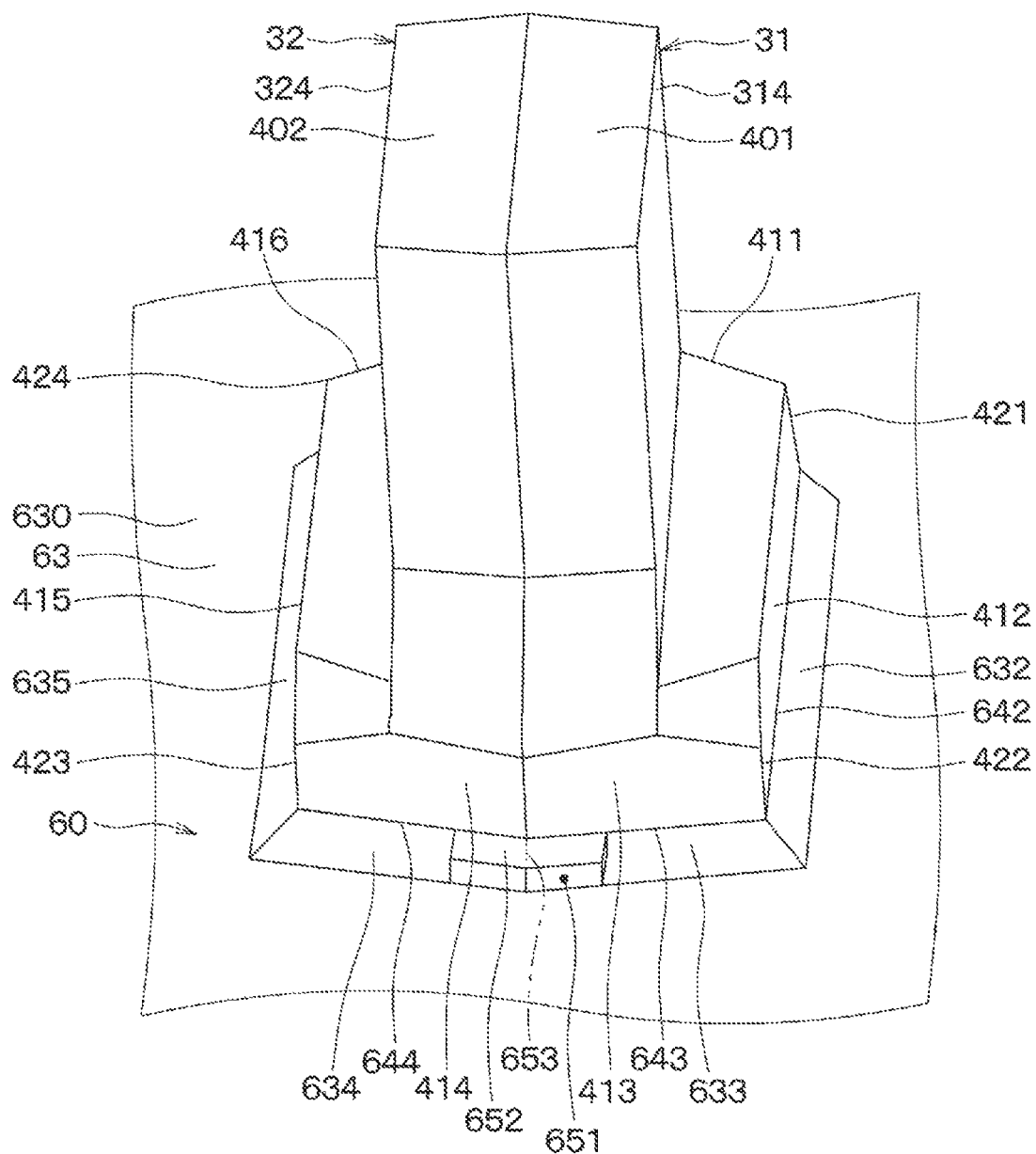
FIG. 12 is a perspective view of the first sensor and the second sensor of the position detection device.

As illustrated in FIG. 11 and FIG. 12, the welded projecting portion 651 is formed in a prismatic shape. Accordingly, a cross section of the welded projecting portion 651 perpendicular to the thickness direction of the sensor cover 60 has a hexagonal shape.

Thus, the fourth embodiment is configured. In the fourth embodiment also, the same effects as achieved in the third embodiment are achieved.

Fifth Embodiment

In the fifth embodiment, the position detection device 30 does not include the first sensor 31 and the second sensor 32, but includes a sensor 33. Additionally, a form of the sensor cover 60 is different from that in the first embodiment. The fifth embodiment is otherwise the same as the first embodiment.

Figure 13:
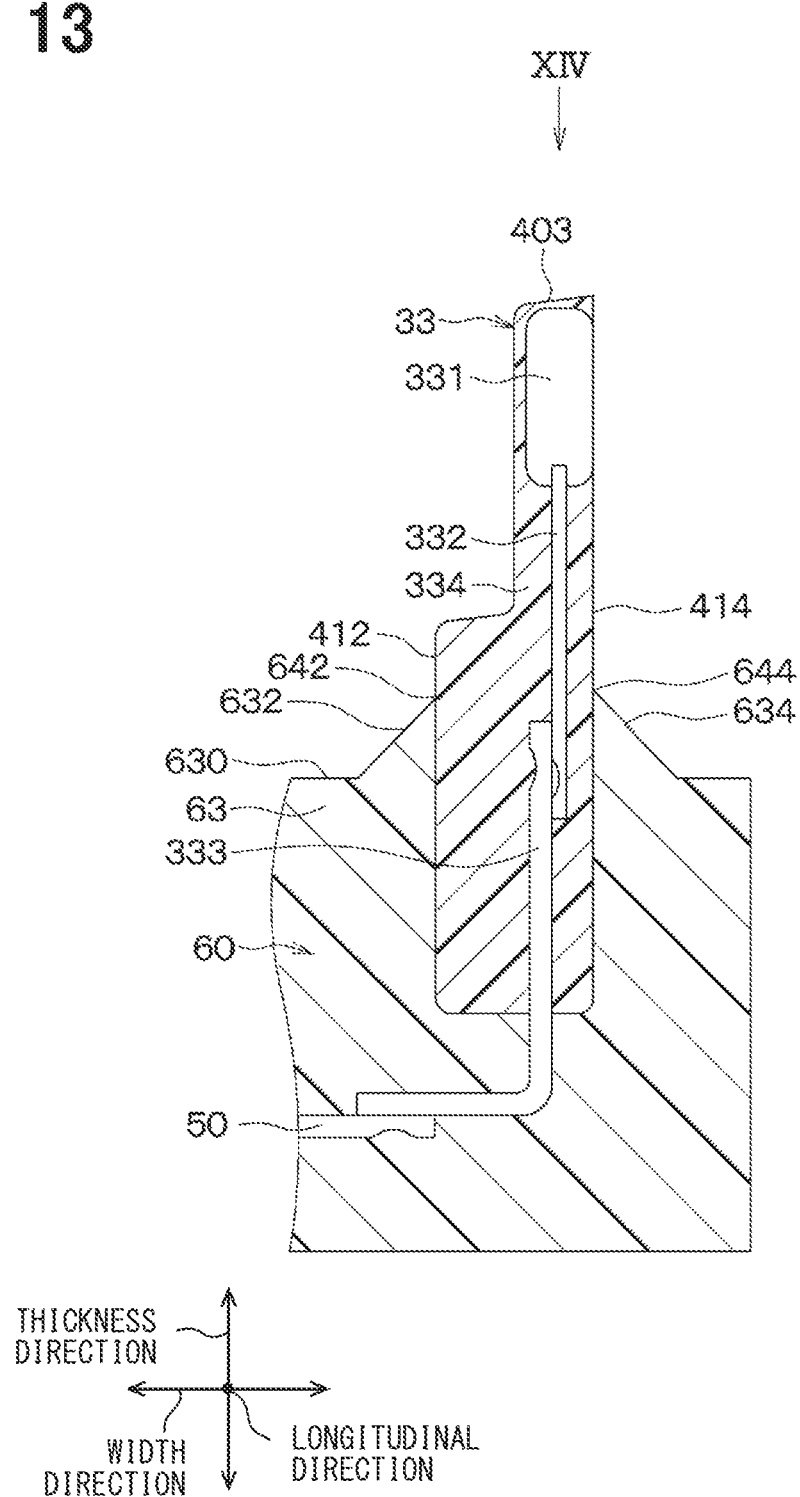
FIG. 13 is a cross-sectional view of a sensor of a position detection device in a fifth embodiment.

The sensor 33 outputs a signal corresponding to the magnetic fluxes flowing in the vicinity of the center of the holder 6. Specifically, as illustrated in FIG. 13, the sensor 33 includes a magnetic detection element 331, a lead line 332, a wire 333, and a resin portion 334.

The magnetic detection element 331 corresponds to the detection unit, and is formed similarly to the first magnetic detection element 311 described above. The lead line 332 corresponds to the first lead line 312 described above. Additionally, the wire 333 corresponds to the first wire 313 described above.

In the resin portion 334, a resin covers the magnetic detection element 331, the lead line 332, and the wire 333 so as to expose a surface of the magnetic detection element 331 and a part of the wire 333. The resin used in the resin portion 334 is a thermosetting resin, in the same manner as with the first resin portion 314 and the second resin portion 324 described above.

Figure 14:
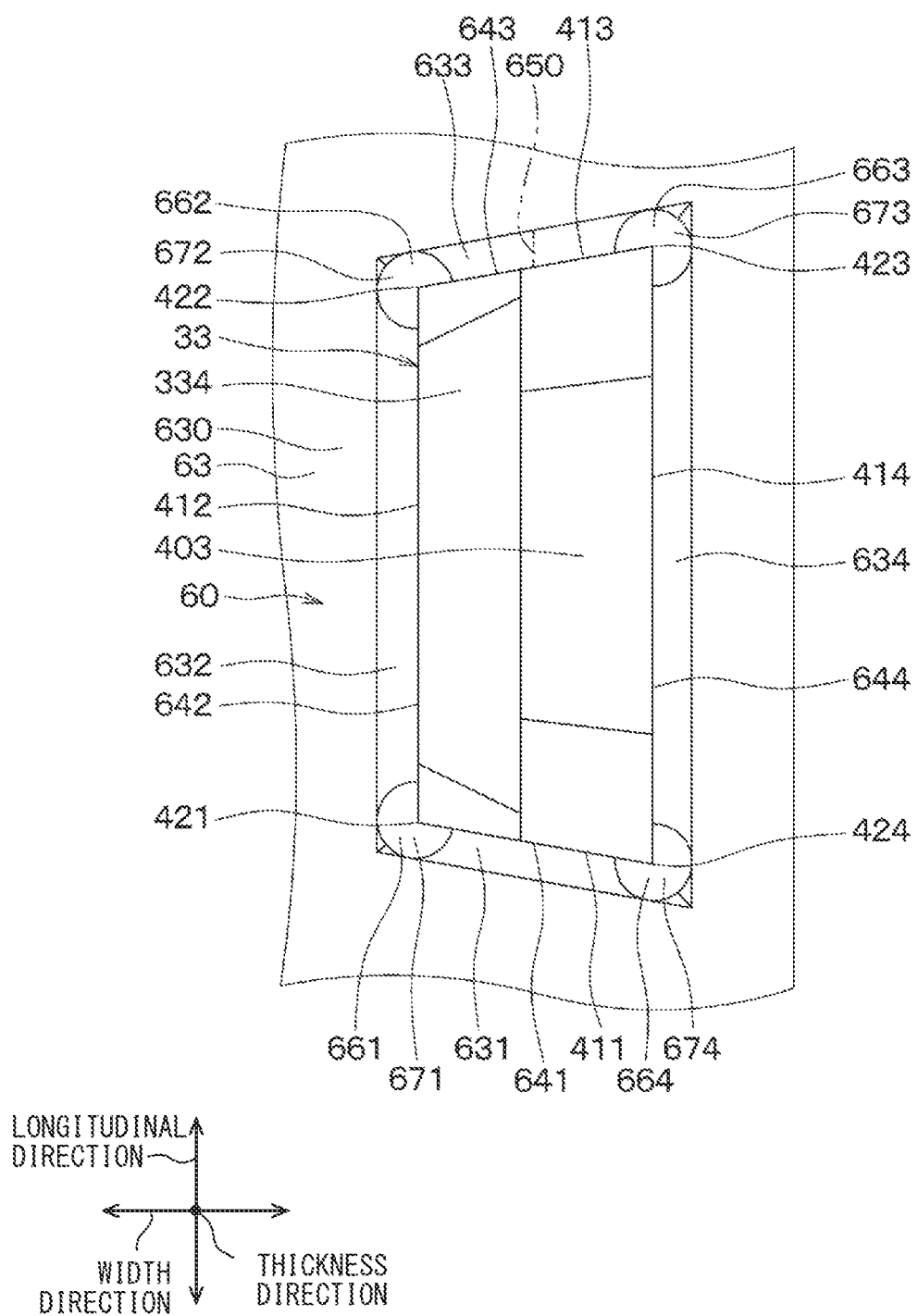
FIG. 14 is an enlarged view as viewed from an arrow XIV in FIG. 13.
Figure 15:
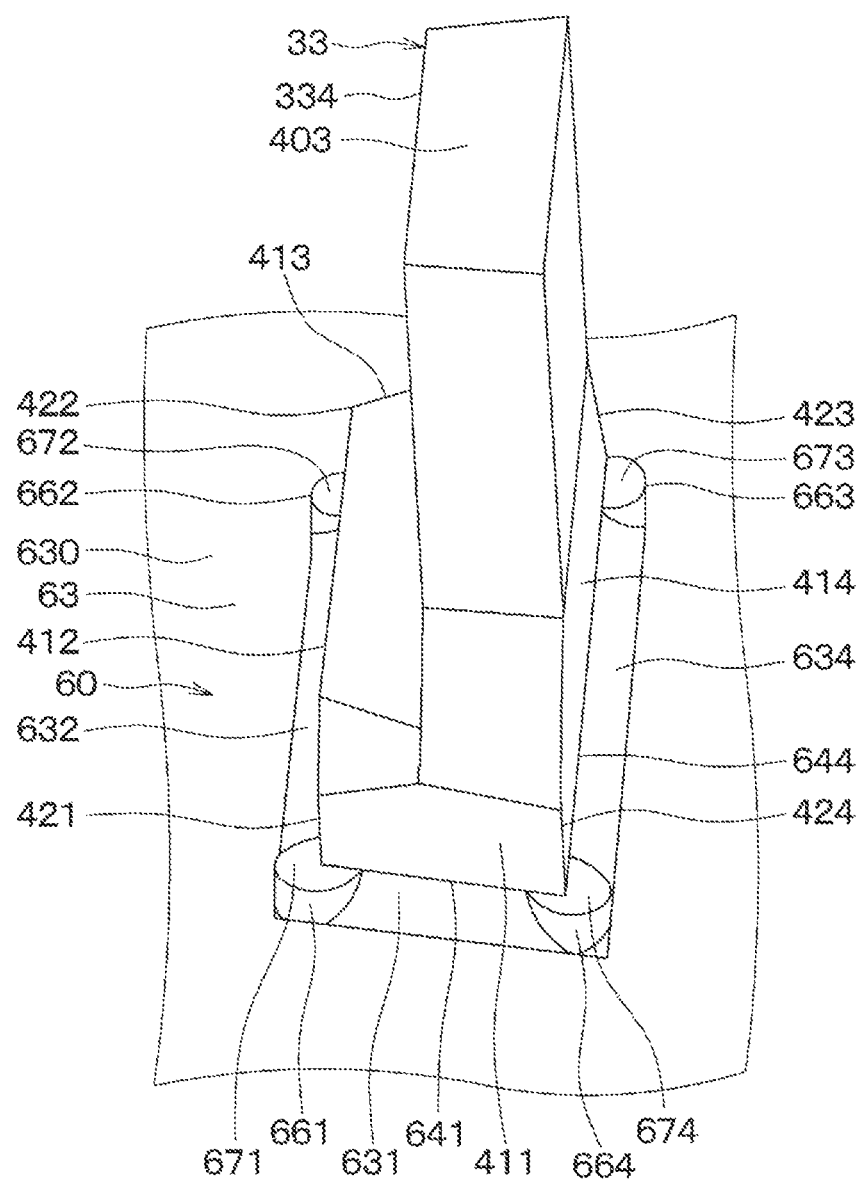
FIG. 15 is a perspective view of the sensor of the position detection device.

The resin portion 334 is disposed so as to protrude from the sensor cover 60. As illustrated in FIG. 14 and FIG. 15, the resin portion 334 includes a protruding surface 403, the first side surface 411, the second side surface 412, the third side surface 413, the fourth side surface 414, the first corner portion 421, the second corner portion 422, the third corner portion 423, and the fourth corner portion 424. Note that, in FIG. 15, to avoid complication in the drawing, the exposed magnetic detection element 331 is omitted.

The protruding surface 403 faces a direction in which the resin portion 334 protrudes. The first side surface 411 is connected to the protruding surface 403. The second side surface 412 is connected to each of the protruding surface 403 and the first side surface 411. The third side surface 413 is connected to each of the protruding surface 403 and the second side surface 412. The fourth side surface 414 is connected to each of the protruding surface 403, the third side surface 413, and the first side surface 411.

In the same manner as described above, the first corner portion 421 corresponds to the boundary portion between the first side surface 411 and the second side surface 412. In the same manner as described above, the second corner portion 422 corresponds to the boundary portion between the second side surface 412 and the third side surface 413. The third corner portion 423 corresponds herein to a boundary portion between the third side surface 413 and the fourth side surface 414. The fourth corner portion 424 corresponds herein to a boundary portion between the fourth side surface 414 and the first side surface 411.

The cover resin portion 63 of the sensor cover 60 covers the wire 333 of the sensor 33. The cover resin portion 63 also covers a part of the resin portion 334 so as to expose the resin portion 334 in which the magnetic detection element 331 is located. As a result, the resin portion 334 protrudes from the sensor cover 60 in the thickness direction of the sensor cover 60. Consequently, the direction in which the resin portion 334 protrudes is coincident with the thickness direction of the sensor cover 60. The cover resin portion 63 covers the part of the resin portion 334 to thereby fix the magnetic detection element 331 at a position in the vicinity of the center of the holder 6.

The cover resin portion 63 includes, in a range in which the cover resin portion 63 covers the resin portion 334, the covering surface 630 facing the direction in which the resin portion 334 protrudes. The cover resin portion 63 further includes the first inclined surface 631, the second inclined surface 632, the third inclined surface 633, the fourth inclined surface 634, the first boundary portion 641, the second boundary portion 642, the third boundary portion 643, and the fourth boundary portion 644. The cover resin portion 63 also includes the welded portion 650, the first projecting portion 661, the second projecting portion 662, the third projecting portion 663, and the fourth projecting portion 664.

In the same manner as described above, the covering surface 630 extends in the longitudinal direction and the width direction of the plate-like sensor cover 60.

In the same manner as described above, the first inclined surface 631 intersects with each of the covering surface 630 and the first side surface 411 of the resin portion 334 to be connected thereto.

In the same manner as described above, the second inclined surface 632 intersects with each of the covering surface 630, the first inclined surface 631, and the second side surface 412 of the resin portion 334 to be connected thereto.

In the same manner as described above, the third inclined surface 633 intersects with each of the covering surface 630, the second inclined surface 632, and the third side surface 413 of the resin portion 334 to be connected thereto.

The fourth inclined surface 634 intersects with each of the covering surface 630, the third inclined surface 633, the first inclined surface 631, and the fourth side surface 414 of the resin portion 334 herein to be connected thereto.

In the same manner as described above, the first boundary portion 641 is the boundary portion between the first inclined surface 631 and the first side surface 411. In the same manner as described above, the second boundary portion 642 is the boundary portion between the second inclined surface 632 and the second side surface 412. In the same manner as described above, the third boundary portion 643 is the boundary portion between the third inclined surface 633 and the third side surface 413. In the same manner as described above, the fourth boundary portion 644 is the boundary portion between the fourth inclined surface 634 and the fourth side surface 414.

As described above, the welded portion 650 is the region of the cover resin portion 63 which is formed by merging of the molten resin flowing in two directions when the sensor cover 60 is molded of a resin. When the sensor cover 60 is molded, the molten resin flowing from the first side surface 411 side along each of the second side surface 412 and the third side surface 413 and the molten resin flowing from the first side surface 411 side along each of the fourth side surface 414 and the third side surface 413 are merged herein. Consequently, the welded portion 650 is formed in the vicinity of a center of the third inclined surface 633 connected to the third side surface 413.

The first projecting portion 661 extends in a direction in which the resin portion 334 of the sensor 33 protrudes. The first projecting portion 661 is formed in an arc prismatic shape, and has an arc-shaped cross section in a cross section when the first projecting portion 661 is cut in a direction perpendicular to the direction in which the resin portion 334 protrudes. The first projecting portion 661 is connected to each of the first side surface 411, the second side surface 412, the first corner portion 421, the first inclined surface 631, the second inclined surface 632, the first boundary portion 641, and the second boundary portion 642. In the same manner as described above, the first projecting portion 661 includes the first projecting surface 671 facing the direction in which the resin portion 334 protrudes. The first projecting surface 671 is located between the protruding surface 403 of the resin portion 334 and each of the first inclined surface 631 and the second inclined surface 632 in the direction in which the resin portion 334 protrudes.

The second projecting portion 662 extends in the direction in which the resin portion 334 protrudes. Similarly to the first projecting portion 661, the second projecting portion 662 is also formed in an arc prismatic shape. In the same manner as described above, the second projecting portion 662 is connected to each of the second side surface 412, the third side surface 413, the second corner portion 422, the second inclined surface 632, the third inclined surface 633, the second boundary portion 642, and the third boundary portion 643. In the same manner as described above, the second projecting portion 662 includes the second projecting surface 672 facing the direction in which the resin portion 334 protrudes. The second projecting surface 672 is located between the protruding surface 403 of the resin portion 334 and each of the second inclined surface 632 and the third inclined surface 633 in the direction in which the resin portion 334 protrudes.

The third projecting portion 663 extends in the direction in which the resin portion 334 protrudes. In the same manner as described above, the third projecting portion 663 is formed in an arc prismatic shape. The third projecting portion 663 is connected herein to each of the third side surface 413, the fourth side surface 414, the third corner portion 423, the third inclined surface 633, the fourth inclined surface 634, the third boundary portion 643, and the fourth boundary portion 644. In the same manner as described above, the third projecting portion 663 includes the third projecting surface 673 facing the direction in which the resin portion 334 protrudes. The third projecting surface 673 is located between the protruding surface 403 of the resin portion 334 and each of the third inclined surface 633 and the fourth inclined surface 634 in the direction in which the resin portion 334 protrudes.

The fourth projecting portion 664 extends in the direction in which the resin portion 334 protrudes. In the same manner as described above, the fourth projecting portion 664 is formed in an arc prismatic shape. The fourth projecting portion 664 is connected herein to each of the fourth side surface 414, the first side surface 411, the fourth corner portion 424, the fourth inclined surface 634, the first inclined surface 631, the fourth boundary portion 644, and the first boundary portion 641. In the same manner as described above, the fourth projecting portion 664 includes the fourth projecting surface 674 facing the direction in which the resin portion 334 protrudes. The fourth projecting surface 674 is located between the protruding surface 403 of the resin portion 334 and each of the fourth inclined surface 634 and the first inclined surface 631 in the direction in which the resin portion 334 protrudes.

Thus, the fifth embodiment is configured. In the fifth embodiment also, the same effects as achieved in the first embodiment are achieved.

Sixth Embodiment

In the sixth embodiment, forms of the first projecting portion 661, the second projecting portion 662, the third projecting portion 663, and the fourth projecting portion 664 are different from those in the fifth embodiment. The sixth embodiment is otherwise the same as the fifth embodiment.

Figure 16:
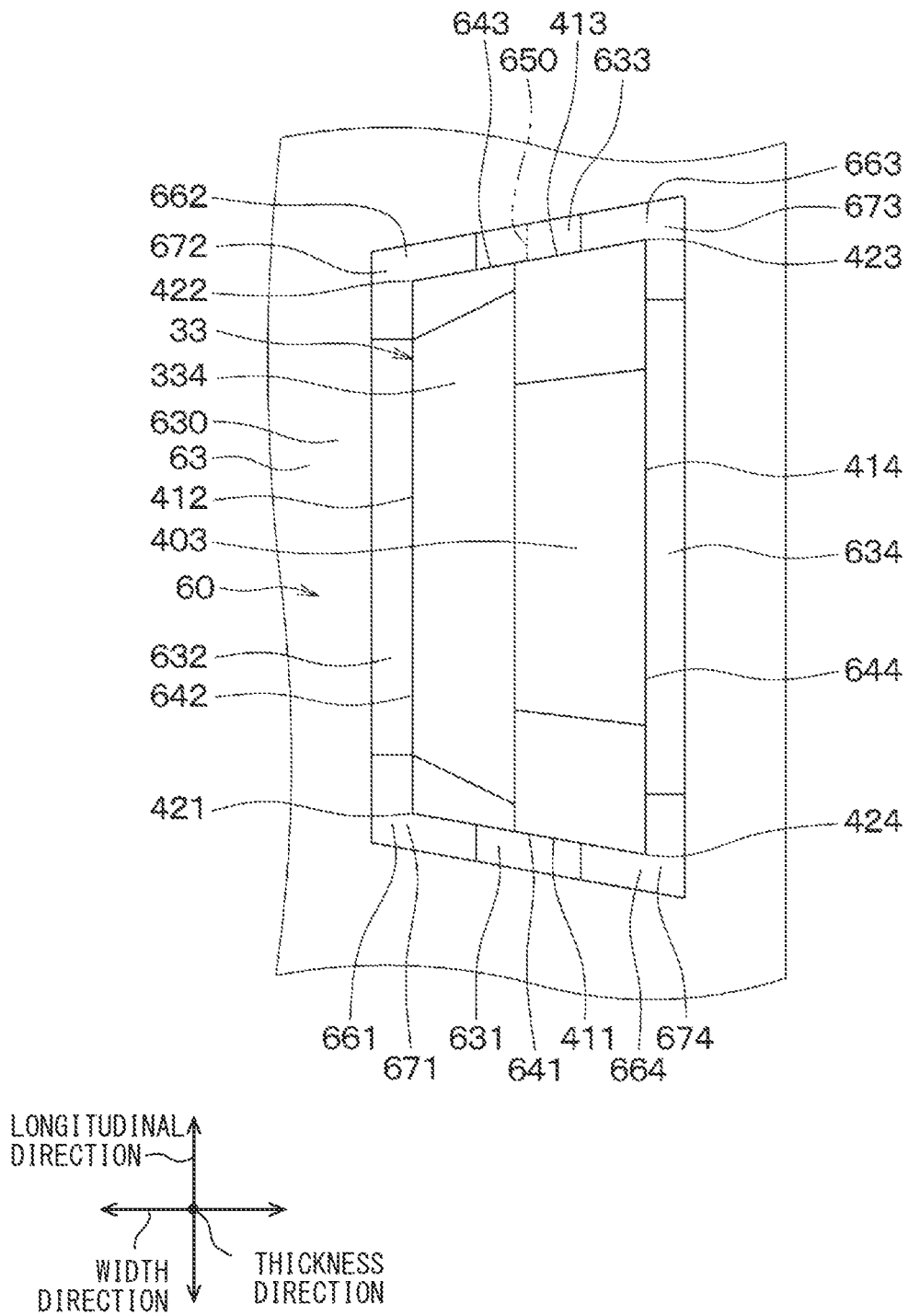
FIG. 16 is a top view of a sensor of a position detection device in a sixth embodiment.
Figure 17:
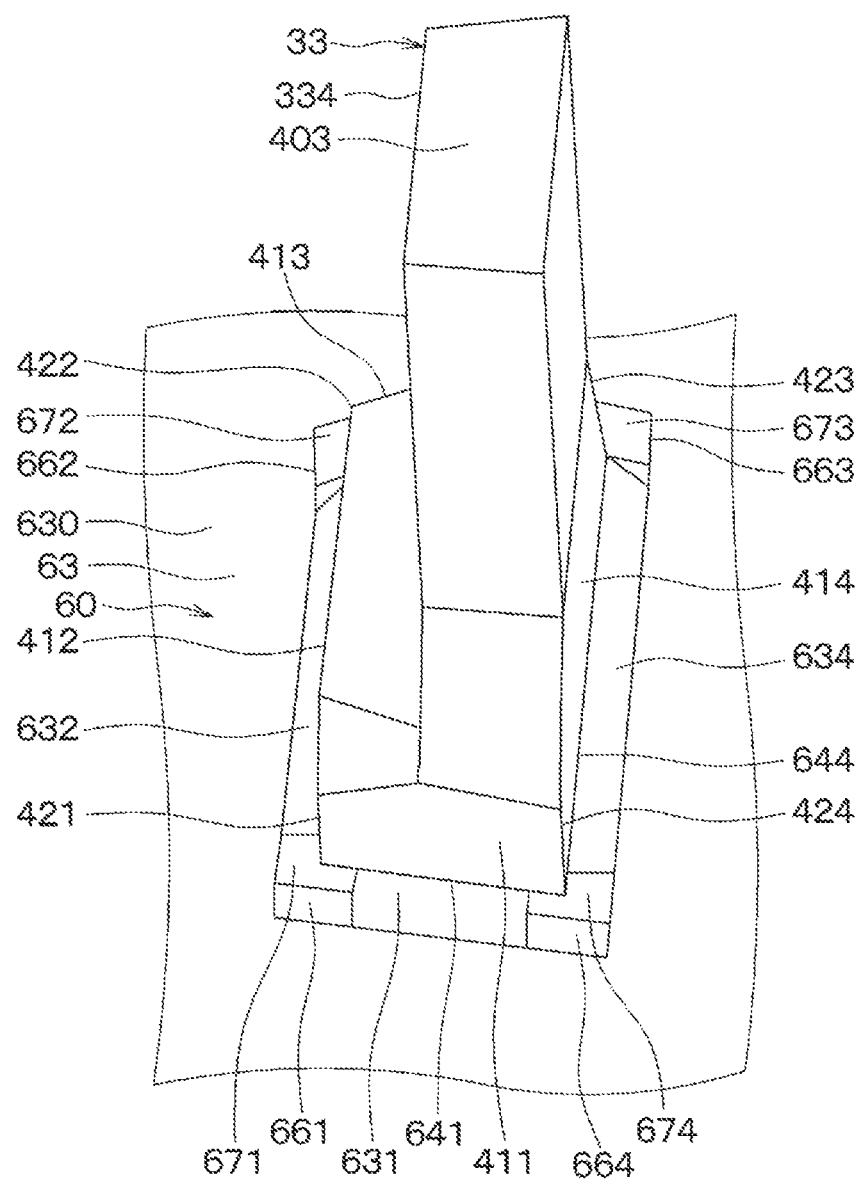
FIG. 17 is a perspective view of the sensor of the position detection device.

As illustrated in FIG. 16 and FIG. 17, each of the first projecting portion 661, the second projecting portion 662, the third projecting portion 663, and the fourth projecting portion 664 is formed in a prismatic shape. Accordingly, a cross section of each of the first projecting portion 661, the second projecting portion 662, the third projecting portion 663, and the fourth projecting portion 664 perpendicular to the direction in which the resin portion 334 protrudes has a hexagonal shape. Note that, in FIG. 17, to avoid complication in the drawing, the exposed magnetic detection element 331 is omitted.

Thus, the sixth embodiment is configured. In the sixth embodiment also, the same effects as achieved in the fifth embodiment are achieved.

Seventh Embodiment

In the seventh embodiment, the cover resin portion 63 of the sensor cover 60 does not include the first projecting portion 661, the second projecting portion 662, the third projecting portion 663, and the fourth projecting portion 664, but includes the welded projecting portion 651. The seventh embodiment is otherwise different from the fifth embodiment.

Figure 18:
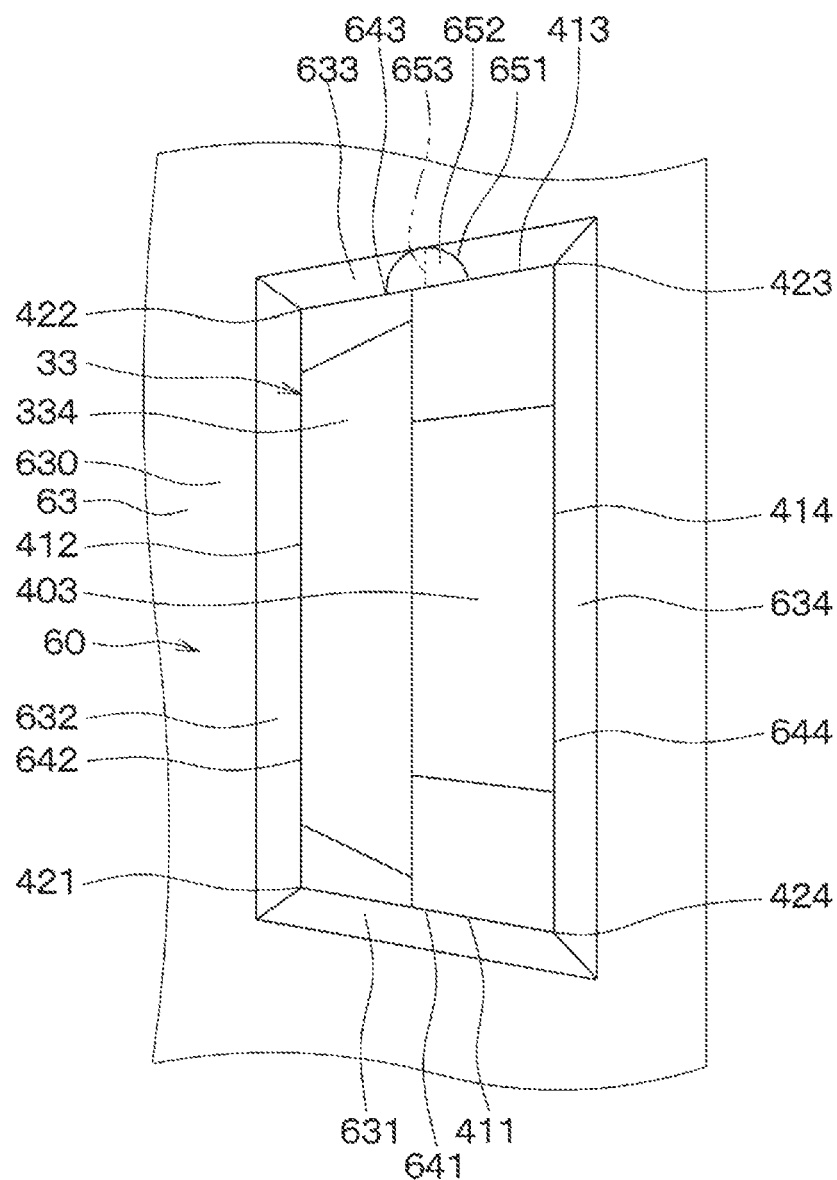
FIG. 18 is a top view of a sensor of a position detection device in a seventh embodiment.
Figure 19:
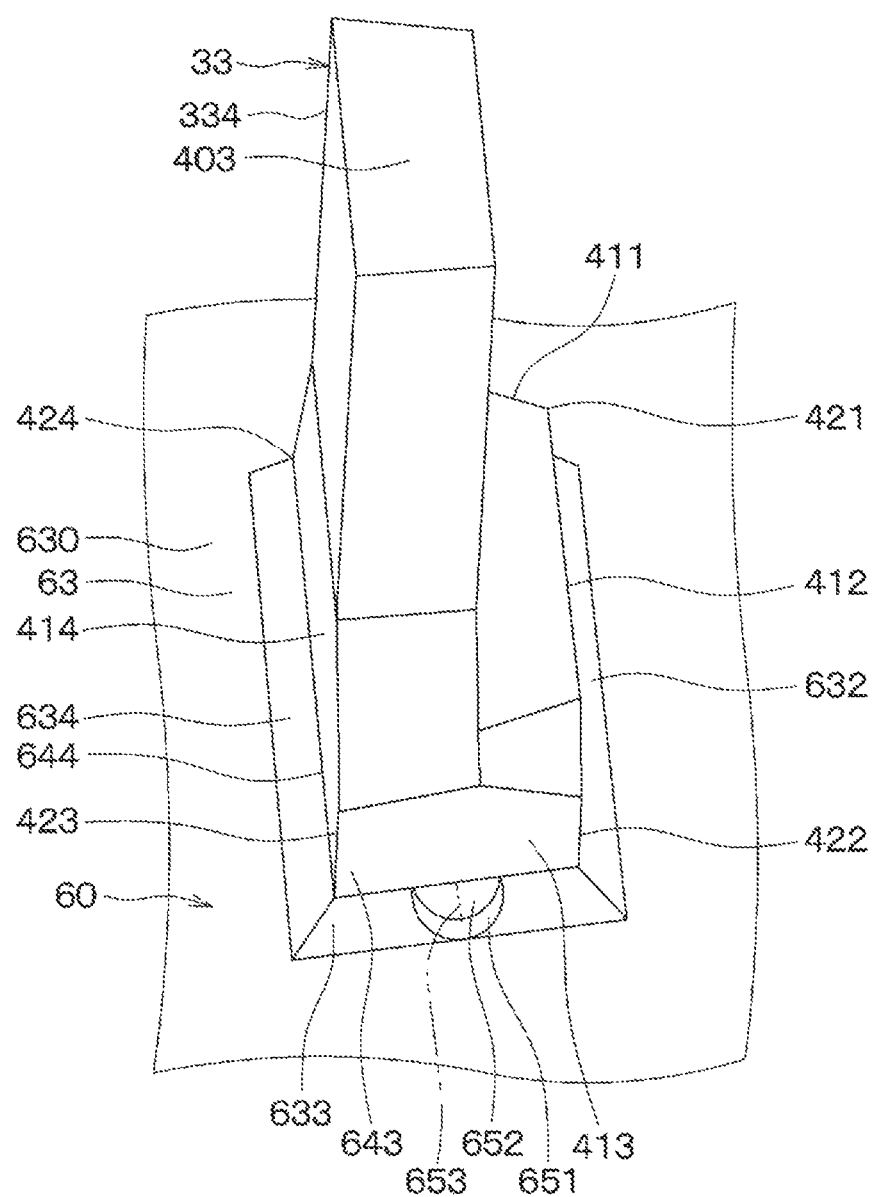
FIG. 19 is a perspective view of the sensor of the position detection device.

As illustrated in FIG. 18 and FIG. 19, the welded projecting portion 651 extends in the thickness direction of the sensor cover 60, which is herein the direction in which the resin portion 334 protrudes. The welded projecting portion 651 is formed in an arc prismatic shape, and has an arc-shaped cross section in a cross section when the welded projecting portion 651 is cut in a direction perpendicular to the thickness direction of the sensor cover 60. The welded projecting portion 651 is connected herein to each of the third inclined surface 633, the third side surface 413, and the third boundary portion 643. The welded projecting portion 651 includes the welded projecting surface 652 facing the thickness direction of the sensor cover 60.

The welded projecting surface 652 is located between the protruding surface 403 of the resin portion 334 and the third inclined surface 633 of the cover resin portion 63 in the thickness direction of the sensor cover 60.

The welded projecting portion 651 is a region of the cover resin portion 63 which is formed by merging of the molten metal flowing in two directions when the sensor cover 60 is molded. In the same manner as described above, when the sensor cover 60 is molded, the molten resin flowing from the first side surface 411 side along each of the second side surface 412 and the third side surface 413 and the molten resin flowing from the first side surface 411 side along each of the fourth side surface 414 and the third side surface 413 are merged. Accordingly, the welded projecting portion 651 connected to the third side surface 413 includes the welded portion 653. Note that, in FIG. 18 and FIG. 19, the welded portion 653 is indicated by the two-dot-dash line.

The welded portion 653 is formed in the vicinity of the center of the welded projecting portion 651. Note that, in FIG. 18 and FIG. 19, the welded portion 653 is indicated by the two-dot-dash line. Note that, in FIG. 19, to avoid complication in the drawing, the exposed magnetic detection element 331 is omitted.

Thus, the seventh embodiment is configured. In the seventh embodiment also, the same effects as achieved in the first embodiment are achieved. In the seventh embodiment, in the same manner as in the third embodiment, in the cover resin portion 63 in the vicinity of the welded portion 653 in which stress concentration is likely to occur, a stress applied to the cover resin portion 63 can be reduced. This prevents the cover resin portion 63 from being damaged.

Eighth Embodiment

In the eighth embodiment, a form of the welded projecting portion 651 is different from that in the seventh embodiment. The eighth embodiment is otherwise the same as the seventh embodiment.

Figure 20:
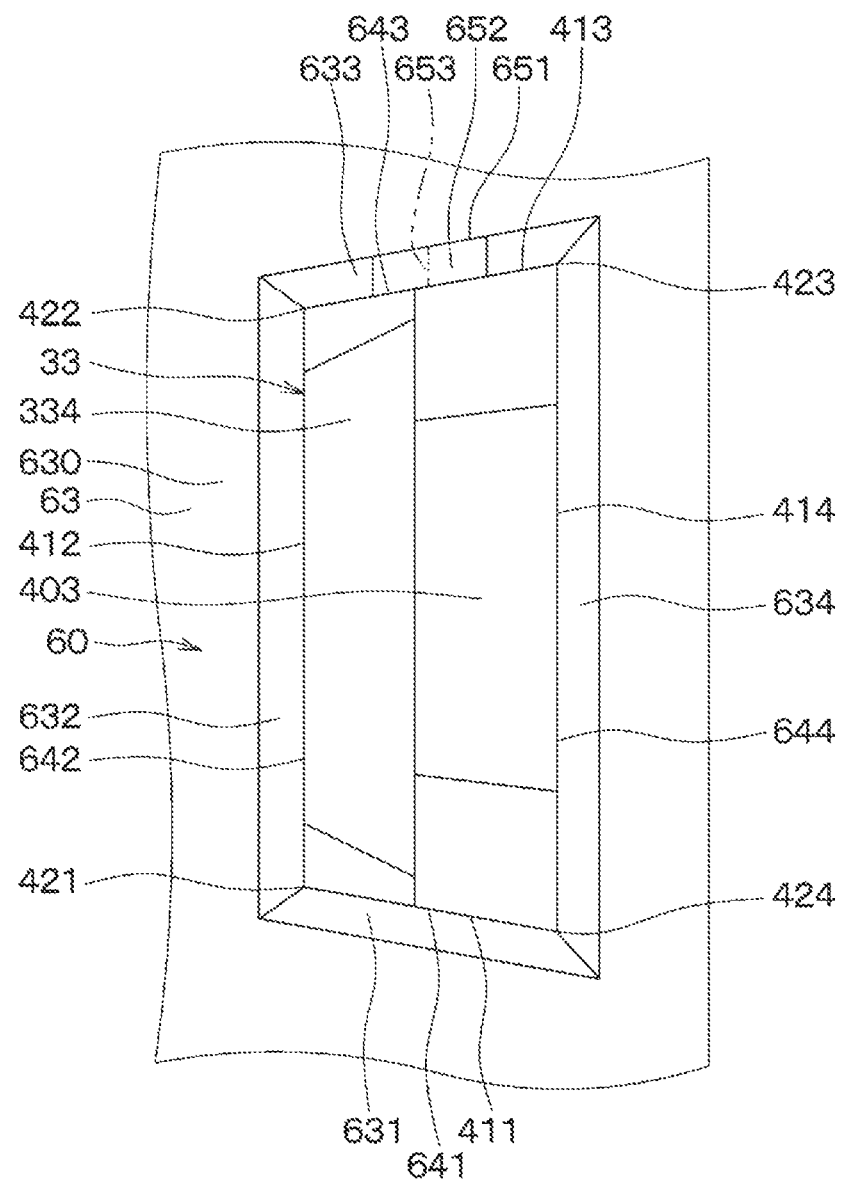
FIG. 20 is a top view of a sensor of a position detection device in an eighth embodiment.
Figure 21:
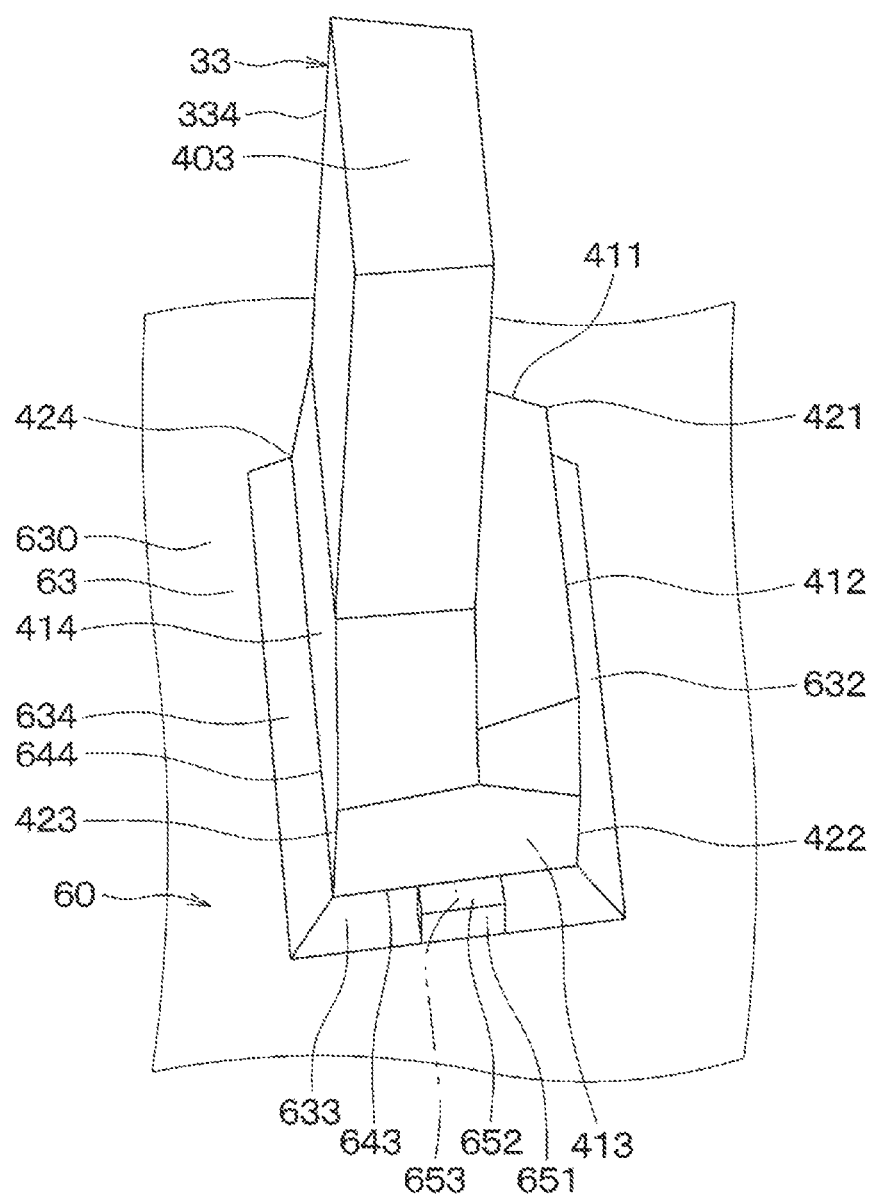
FIG. 21 is a perspective view of the sensor of the position detection device.

As illustrated in FIG. 20 and FIG. 21, the welded projecting portion 651 is formed in a prismatic shape. Accordingly, a cross section of the welded projecting portion 651 perpendicular to the thickness direction of the sensor cover 60 has a hexagonal shape.

Thus, the eighth embodiment is configured. In the eighth embodiment also, the same effects as achieved in the seventh embodiment are achieved.

Other Embodiments

The present disclosure is not limited to the embodiments described above and can appropriately be changed from the embodiments described above. Needless to say, in each of the embodiments described above, the components thereof are not necessarily indispensable unless particularly explicitly described otherwise or unless the components are considered to be obviously indispensable in principle.

In the embodiments described above, the position detection device 30 detects the rotation angle of the throttle valve 3 of the vehicle. However, the position detection device 30 is not limited to the detection of the rotation angle of the throttle valve 3 of the vehicle. The position detection device 30 may also detect a position of an actuator that drives, e.g., a valve used in an EGR of a vehicle, an accelerator pedal of a vehicle, a brake pedal, a tumble control valve, a clutch, or the like.

In the embodiments described above, each of the first magnetic detection element 311, the second magnetic detection element 321, and the magnetic detection element 331 is a Hall element. However, each of the first magnetic detection element 311, the second magnetic detection element 321, and the magnetic detection element 331 is not limited to the Hall element, and may also be, e.g., an MR element or the like. Note that MR is the abbreviation of Magneto Resistive.

In the embodiments described above, each of the first sensor 31, the second sensor 32, and the sensor 33 detects a change in the magnetic flux that changes in response to a change in the position of the object to be detected. However, each of the first sensor 31, the second sensor 32, and the sensor 33 is not limited to the detection of a change in the magnetic flux that changes in response to a change in the position of the object to be detected. For example, each of the first sensor 31, the second sensor 32, and the sensor 33 may be an inductive sensor that detects impedance of a coil that changes in response to a change in the position of the object to be detected or the like. Alternatively, each of the first sensor 31, the second sensor 32, and the sensor 33 may also be a potentiometer that detects an electric resistance of a resistor that changes in response to a change in the position of the object to be detected or the like.

Figure 22:
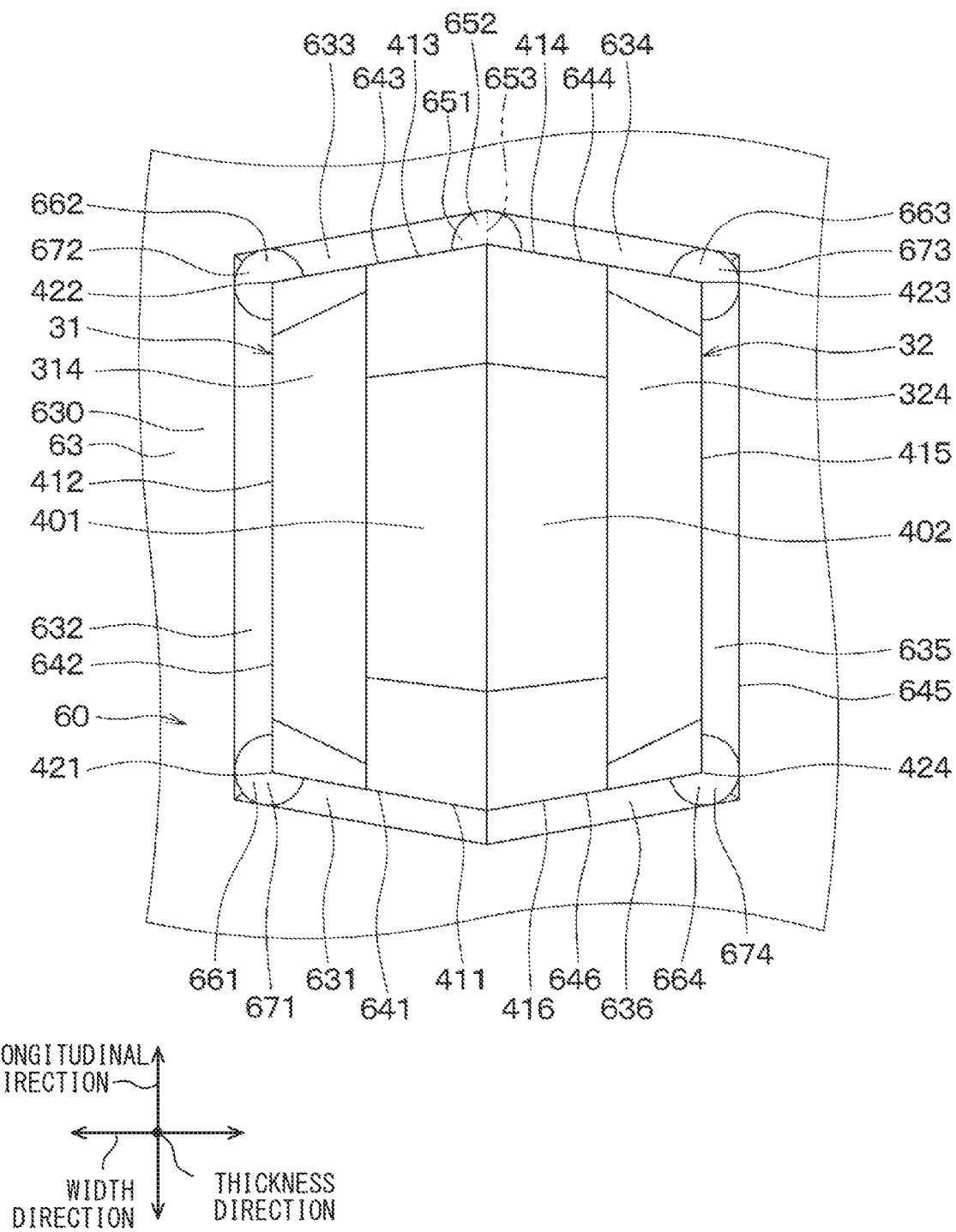
FIG. 22 is a top view of a sensor of a position detection device in another embodiment.
Figure 23:
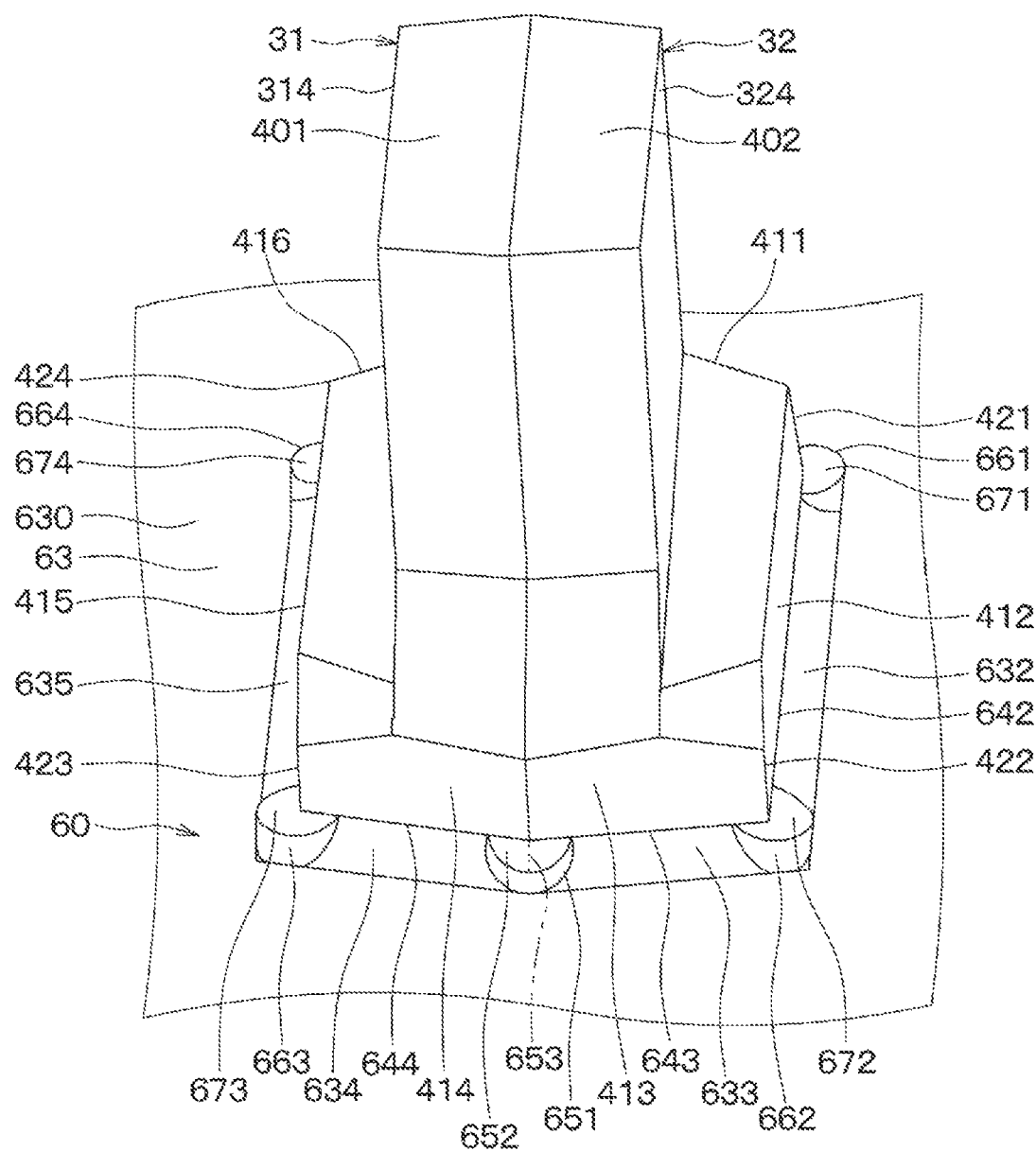
FIG. 23 is a perspective view of the sensor of the position detection device in the other embodiment.

The first embodiment and the third embodiment each described above may also be combined with each other. Specifically, as illustrated in FIG. 22 and FIG. 23, the cover resin portion 63 in the first embodiment further includes the welded projecting portion 651.

Likewise, the fifth embodiment and the seventh embodiment may also be combined with each other. Specifically, the cover resin portion 63 further includes the welded projecting portion 651 in a range in which the cover resin portion 63 covers the resin portion 334.

Figure 24:
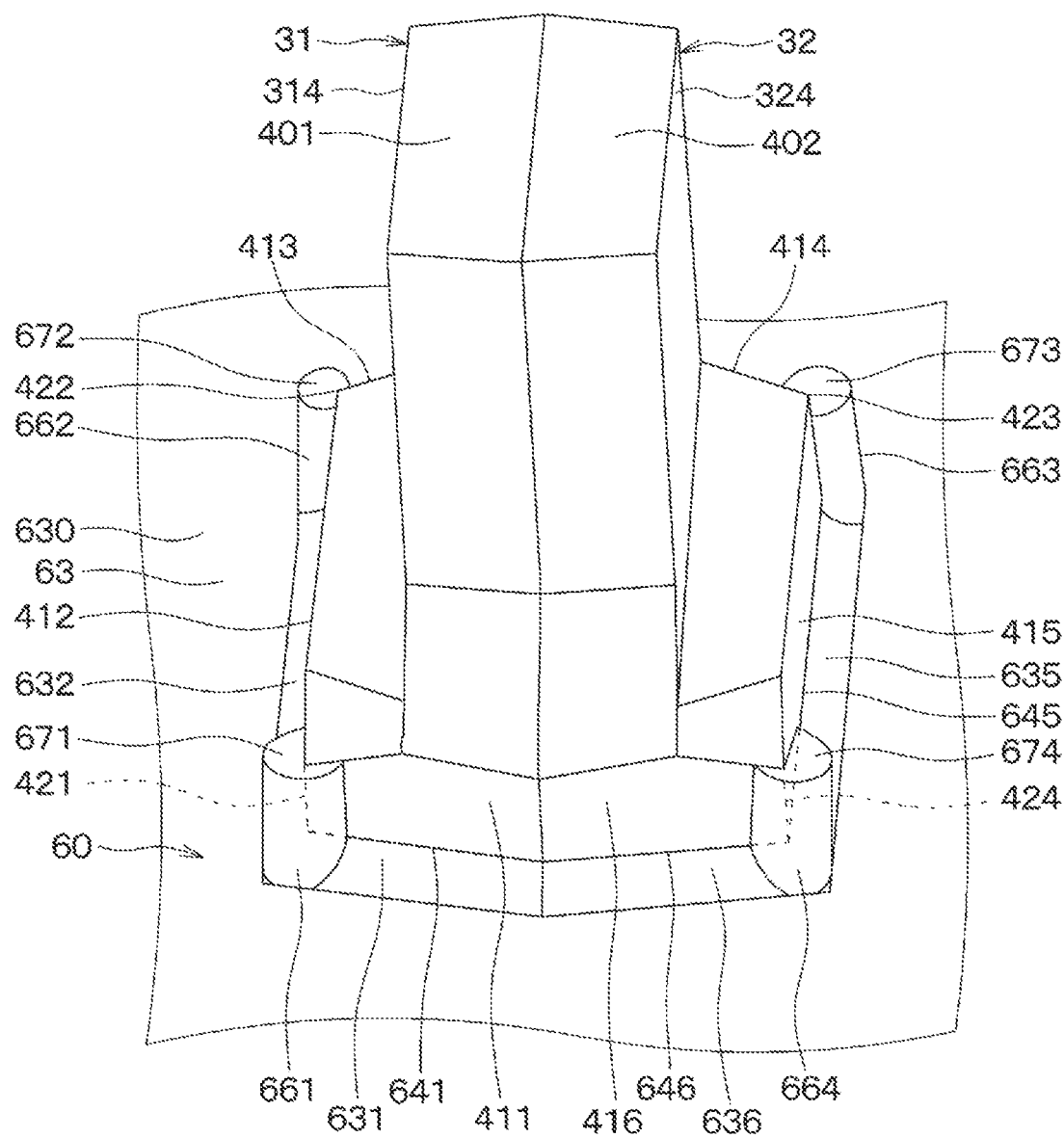
FIG. 24 is a perspective view of the sensor of the position detection device in the other embodiment.

Alternatively, in the first embodiment, as illustrated in, e.g., FIG. 24, the first projecting portion 661 may also cover the first corner portion 421, a part of the first side surface 411, and a part of the second side surface 412. The second projecting portion 662 may also cover the second corner portion 422, a part of the second side surface 412, and a part of the third side surface 413. The third projecting portion 663 may also cover the third corner portion 423, a part of the fourth side surface 414, and a part of the fifth side surface 415. The fourth projecting portion 664 may also cover the fourth corner portion 424, a part of the fifth side surface 415, and a part of the sixth side surface 416.

In the second embodiment and the sixth embodiment each described above, each of the first projecting portion 661, the second projecting portion 662, the third projecting portion 663, and the fourth projecting portion 664 is formed in the hexagonal prismatic shape. However, the shape of each of the first projecting portion 661, the second projecting portion 662, the third projecting portion 663, and the fourth projecting portion 664 is not limited to the hexagonal prismatic shape, and each of the first projecting portion 661, the second projecting portion 662, the third projecting portion 663, and the fourth projecting portion 664 may also be formed in a polygonal prismatic shape. Meanwhile, in the fourth embodiment and the eighth embodiment each described above, the welded projecting portion 651 is formed in the hexagonal prismatic shape. However, the shape of the welded projecting portion 651 is not limited to the hexagonal prismatic shape, and the welded projecting portion 651 may also be formed in a polygonal prismatic shape.

In the embodiments described above, the first projecting portion 661 is connected to each of the first inclined surface 631, the second inclined surface 632, the first side surface 411, the second side surface 412, the first corner portion 421, the first boundary portion 641, and the second boundary portion 642. However, the first projecting portion 661 may also be connected only to, e.g., each of the first inclined surface 631, the first side surface 411, and the first boundary portion 641. Likewise, each of the second projecting portion 662, the third projecting portion 663, and the fourth projecting portion 664 may also be connected only to each of the corresponding inclined surface, the corresponding side surface, and the corresponding boundary portion with the first resin portion 314, the second resin portion 324, or the resin portion 334 of the cover resin portion 63.

The embodiments described above may also be combined with each other.

What is claimed is:

1. A position detection device comprising:
    a sensor including a detection unit configured to output a signal corresponding to a change in a position of an object, which is to be detected, and a resin portion covering the detection unit; and
    a cover formed of a resin, which has a linear expansion coefficient different from a linear expansion coefficient of the resin portion, to cover a part of the resin portion such that the resin portion protrudes, wherein
    the resin portion has
        a protruding surface facing a direction in which the resin portion protrudes and
        a side surface connected to the protruding surface,
    the cover has
        a covering surface facing the direction in which the resin portion protrudes,
        an inclined surface intersecting with each of the covering surface and the side surface to be connected to each of the covering surface and the side surface, and
        a projecting portion projecting in the direction in which the resin portion protrudes,
    the projecting portion is connected to each of the side surface and the inclined surface,
    the side surface is a first side surface,
    the inclined surface is a first inclined surface,
    the resin portion has
        a second side surface connected to each of the protruding surface and the first side surface and
        a corner portion that is a boundary portion between the first side surface and the second side surface,
    the cover further has a second inclined surface intersecting with each of the covering surface and the second side surface to be connected to each of the covering surface and the second side surface, and
    the projecting portion is connected to each of the first side surface, the second side surface, the corner portion, the first inclined surface, and the second inclined surface.

2. The position detection device according to claim 1, wherein
    the projecting portion includes a projecting surface facing the direction in which the resin portion protrudes, and
    the projecting surface is located between the protruding surface and the inclined surface in the direction in which the resin portion protrudes.

3. A position detection device comprising:
    a sensor including a detection unit configured to output a signal corresponding to a change in a position of an object, which is to be detected, and a resin portion covering the detection unit; and
    a cover formed of a resin, which has a linear expansion coefficient different from a linear expansion coefficient of the resin portion, to cover a part of the resin portion such that the resin portion protrudes, wherein
    the resin portion has
        a protruding surface facing a direction in which the resin portion protrudes and
        a side surface connected to the protruding surface,
    the cover has
        a covering surface facing the direction in which the resin portion protrudes,
        an inclined surface intersecting with each of the covering surface and the side surface to be connected to each of the covering surface and the side surface, and
        a projecting portion projecting in the direction in which the resin portion protrudes, the projecting portion is connected to each of the side surface and the inclined surface, and
    the projecting portion includes a welded portion formed by merging of the resin flowing in two directions when the cover is molded.

* * * * *